(12) United States Patent
Zwol et al.

(10) Patent No.: US 9,349,129 B2
(45) Date of Patent: May 24, 2016

(54) MEDIA ENRICHMENT SYSTEM AND METHOD

(75) Inventors: Roelof van Zwol, Sunnyvale, CA (US); Lluis Garcia Pueyo, San Francisco, CA (US); Lyndon Kennedy, San Francisco, CA (US); Yash Dayal, Bangalore Kamataka (IN); Mridul Muralidharan, Bangalore Kamataka (IN); Thomas Gulik, Sausalito, CA (US); Tejaswi Kasturi, Alhambra, CA (US)

(73) Assignee: YAHOO! INC., Sunnyvale, CA (US)

( * ) Notice: Subject to any disclaimer, the term of this patent is extended or adjusted under 35 U.S.C. 154(b) by 326 days.

(21) Appl. No.: 13/274,812

(22) Filed: Oct. 17, 2011

(65) Prior Publication Data
US 2013/0097285 A1  Apr. 18, 2013

(51) Int. Cl.
*G06F 15/16* (2006.01)
*G06Q 30/02* (2012.01)

(52) U.S. Cl.
CPC .................... *G06Q 30/02* (2013.01)

(58) Field of Classification Search
CPC ......... G06F 15/16; H04L 65/60; H04L 67/02; H04L 65/602; H04L 65/4084
USPC .................. 709/219, 220, 203, 204, 206
See application file for complete search history.

(56) References Cited

U.S. PATENT DOCUMENTS

| 2005/0102258 | A1* | 5/2005 | Tecu et al. ..................... 707/1 |
| 2007/0166687 | A1* | 7/2007 | Bell et al. ...................... 434/350 |
| 2011/0022589 | A1* | 1/2011 | Bauer et al. ................... 707/723 |
| 2011/0113444 | A1* | 5/2011 | Popovich ....................... 725/32 |

* cited by examiner

*Primary Examiner* — Hua Fan
*Assistant Examiner* — Normin Abedin
(74) *Attorney, Agent, or Firm* — James J. DeCarlo; Greemberg Traurig, LLP

(57) ABSTRACT

Disclosed herein are aspects associated with contextual, or related, media enrichment presentation item of a media object served via the internet. A request to annotate a media object in connection with the media object's presentation is received, and a media object identifier and a profile identifier are obtained. The media object's information is retrieved using the media object identifier, and a profile is retrieved using the profile identifier. A response including one or more references to one or more media enrichment presentation items is transmitted, each reference to a media enrichment presentation item comprising information for use in retrieving the media enrichment presentation item for presentation in connection with presentation of the media object.

30 Claims, 18 Drawing Sheets

```
URL: http://yima.yahoo.com/postLogData/
Data:
id=abcd-efgh-hijk-lmnop
source=abcdef123
campaignId=abcd1234
spaceId=abcdef123
ultPageviewId=abcdef123
timestamp=1313049370062
experienceId=abcd1234
interactionTypeId=abcd1234
interactionValue=2
```

FIGURE 10A

```
URL: http://www.yahoo.com/yima/postLogData/
Data:
    id=abcd-efgh-hijk-lmnop
    source=abcdef123
    campaignId=abcd1234
    spaceId=abcdef123
    ultPageviewId=abcdef123
    timestamp=1313049370062
    [{"experienceId": "abcd1234", "interactionTypeId": "abcd1234", "interactionValue":2}
    {"experienceId": "abcd1234", "interactionTypeId": "xyz123", "interactionValue":7}
    ]
```

FIGURE 10B

```
URL: http://www.yahoo.com/yima/postLogData/
Data:
    id=abcd-efgh-hijk-lmnop
    source=abcdef123
    campaignId=abcd1234
    spaceId=abcdef123
    ultPageviewId=abcdef123
    timestamp=1313049370062
    userInteraction = [{"experienceId":"abcd1234", "interactionTypeId":"abcd1234", "interactionValue":2, "interactionTypeId":"xyz123", "interactionValue":7, ...more such entries},
    {"experienceId":"abcd1234", "interactionTypeId":"abcd1234", "interactionValue":2},
    ....
    ]
```

FIGURE 10C

MEDIA ENRICHMENT SYSTEM AND METHOD

FIELD OF THE DISCLOSURE

The present disclosure relates to enriching presentation of a media object, and more specifically to an enriched presentation of the media object with information, e.g., content or other information or data, which can be presented in the form of advertisements related to entities, events, products, etc. appearing in the media object. The same framework can be used to provide additional factual information about the entities, topics, events, etc., providing a presentation blending advertising with contextual, topical and/or factual information related to the media object and/or the advertising in connection with the media object presentation.

BACKGROUND

The web has become a vast store of media objects, including images, video and/or audio, slideshows, etc., and new media objects are steadily being added. Media objects can be downloaded to a computing device via the web and a browser or other application executing on the device. Typically, the media object contains one or more objects or items and has context, which can be determined from the media object content and/or the content, e.g., web page content, served with the media object.

SUMMARY

The present disclosure seeks to address failings in the art and to rich media presentation of media objects with content or other information, such as advertisements, product offers, factual and/or contextual information related to the media objects. In accordance with one or more embodiments, information specific to a media object, in the form of advertisements, product offers, etc., that are related to entities, events, products, etc. appearing in the media object is provided. In accordance with one or more embodiments, the enrichment comprises a presentation blending advertisements and/or product offers with topical information, such as factual and/or contextual information. In accordance with one or more embodiments, the enrichment information is determined from information collected using any of one or more collection sources and/or tools, such as without limitation, paid human editors, crowd sourcing, computer vision automatic technology, or some combination of collection sources and/or tools.

In accordance with one or more embodiments, rich presentation of a media object is provided, and more specifically an enriched presentation of the media object with information, e.g., content or other information or data, which can be presented in the form of advertisements related to entities, events, products, etc. appearing in the media object is provided. The same framework can be used to provide additional factual information about the entities, topics, events, etc., providing a presentation blending advertising with contextual, topical and/or factual information related to the media object and/or the advertising in connection with the media object presentation.

In accordance with one or more embodiments, a method is provided comprising transmitting via at least one processing unit, embedded code in connection with a media object to be presented in connection with a web page, the embedded code to generate a request to enrich the media object in connection with the media object's presentation; receiving, via the at least one processing unit, the request to enrich the media object's presentation, the request comprising a media object identifier and a profile identifier; retrieving, via the at least one processing unit, the media object's information using the media object identifier; retrieving, via the at least one processing unit and from a profile store, a profile using the profile identifier; and transmitting, via at least one processing unit, a response to the request, the response including one or more references to one or more media enrichment presentation items, the one or more media enrichment presentation items comprising at least one advertisement, each reference to a media enrichment presentation item comprising information for use in retrieving the media enrichment presentation item for presentation in connection with the media object's presentation, the profile specifying a manner of presentation for each of the one or more media enrichment presentation items.

In accordance with other aspects of the present disclosure, a system is provided, which comprises at least one computing device comprising one or more processors to execute and memory to store instructions to transmit embedded code in connection with a media object to be presented in connection with a web page, the embedded code to generate a request to enrich the media object's presentation; receive the request to annotate the media object, the request comprising a media object identifier and a profile identifier; retrieve the media object's information using the media object identifier; retrieve, from a profile store, a profile using the profile identifier; and transmit a response to the request, the response including one or more references to one or more media enrichment presentation items, the one or more media enrichment presentation items comprising an advertisement, each reference to a media enrichment presentation item comprising information for use in retrieving the media enrichment presentation item for presentation in connection with the media object's presentation, the profile specifying a manner of presentation for each of the one or more media enrichment presentation items.

In accordance with another aspect described in connection with one or more embodiments, a computer readable non-transitory storage medium for tangibly storing thereon computer readable instructions is provided, the computer readable instructions when executed cause at least one processor to transmit embedded code in connection with a media object to be presented in connection with a web page, the embedded code to generate a request to enrich the media object's presentation; receive the request to enrich the media object's presentation, the request comprising a media object identifier and a profile identifier; retrieve the media object's information using the media object identifier; retrieve, from a profile store, a profile using the profile identifier; and transmit a response to the request, the response including one or more references to one or more media enrichment presentation items, the one or more media enrichment presentation items comprising at least one advertisement, each reference to a media enrichment presentation item comprising information for use in retrieving the media enrichment presentation item for presentation in connection with the media object's presentation, the profile specifying a manner of presentation for each of the one or more media enrichment presentation items.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an overview illustrating in-media enrichment components in accordance with one or more embodiments.

FIG. 2 provides an overview of media object registration in accordance with one or more embodiments of the present disclosure.

FIG. 3, which comprises FIGS. 3A and 3B, provides a media object media enrichment presentation item process flow in accordance with one or more embodiments.

FIG. 4, which comprises FIGS. 4A and 4B, provides an exemplary media object enrichment process flow in accordance with one or more embodiments of the present disclosure.

FIGS. 5-9 provides examples of a media object enrichment user interface for use in accordance with one or more embodiments of the present disclosure.

FIG. 10, which comprises FIGS. 10A-10C, provides examples of information that can be sent in connection with a logging request in accordance with one or more embodiments.

FIGS. 11-19 provide examples of advertisement and product offer media enrichment presentation items in accordance with one or more embodiments of the present disclosure.

DETAILED DESCRIPTION

Figure 1:
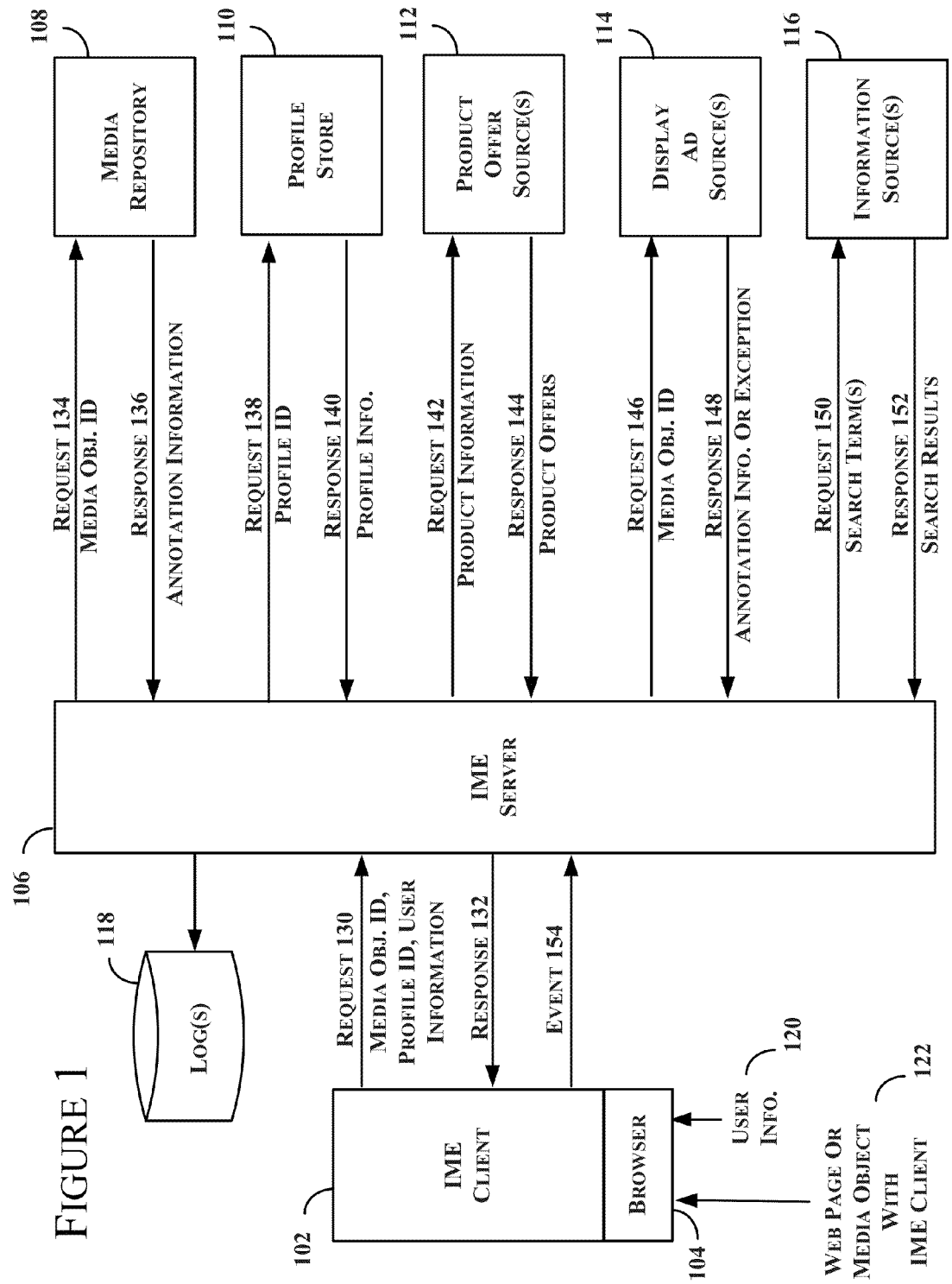

In general, the present disclosure includes an in-media media enrichment presentation item system, method and architecture. Certain embodiments of the present disclosure will now be discussed with reference to the aforementioned figures, wherein like reference numerals refer to like components.

In accordance with one or more embodiments, one or more contextual, or related, media enrichment presentation items of a media object are served via the internet. In accordance with one or more such embodiments, a request is received to annotate a media object in connection with the media object's presentation, and a media object identifier and profile identifier are obtained. The media object's information is retrieved using the media object identifier, and a profile is retrieved using the profile identifier. A response including one or more references to one or more media enrichment presentation items is transmitted, each reference to a media enrichment presentation item comprising information for use in retrieving the media enrichment presentation item for presentation in connection with presentation of the media object.

In accordance with one or more embodiments, in-media enrichment (IME) is a form of contextual, or related, presentation of a media object with one or more media enrichment presentation items, e.g., content or other information or data, that annotates the presentation of a media object served via the internet. A media enrichment presentation item can be served in connection with the media object. By way of some non-limiting examples, a media enrichment presentation item can be a product offer, an advertisement and/or contextual information. In accordance with one or more embodiments, contextual information is displayed in an information box, and provides information related to the media object, e.g., information about an entity, item, etc. found in the media object. In-media enrichment can use data about a media object, e.g., from the media object's metadata and/or tags, and/or content, e.g., the content of the media object and/or web page with which the media object may be served, to match the media object with contextually-relevant media enrichment presentation items. Advertising topics and/or categories associated with a media object can be used to identify one or more display ads to annotate the media object. Additionally, the media object and associated metadata can be analyzed to identify items, e.g., products, celebrities, brands and events, found in, or associated with, the media objects.

In accordance with one or more embodiments, a media object can include an image, video, slideshow, multimedia, etc. A slideshow can comprise a set of related or unrelated images and/or video. A media object can comprise multiple images, videos and/or slideshows.

A media object can be from any source, including without limitation media objects uploaded by users using a media object upload service, such as without limitation Flickr™. A new media object can be enriched using an enrichment process in accordance with one or more embodiments of the present disclosure, which identifies advertising topics and/or categories, products, information items that can be used to identify one or more media enrichment presentation items to be served in connection with new media object. The enrichment process can comprise an automated enrichment, which uses one or more computing devices executing one or more enrichment processes to retrieve information about the media object and analyze the media object content to identify the advertising topics and/or categories, products and/or information items. The enrichment can comprise an enrichment and editorial tool, which is provided by one or more computing devices and allows human editors to identify the advertising topics and/or categories, products and/or information items.

In-Media Enrichment

FIG. 1 provides an overview illustrating IME components in accordance with one or more embodiments. In accordance with one or more embodiments, one or more media enrichment presentation items can be served to a client, or user, computer in response to an IME request 130. An IME request 130 is transmitted from an IME client 102 application executing at the user computer. In accordance with one or more embodiments, the IME client 102 executes with a browser 104 at the user computer. By way of a non-limiting example, the IME client 102 comprises code that is received and executed with the browser 104 in connection with a transmission 122 received at the user computer and directed to the browser 102. The transmission 122 can comprise a web page, e.g., Hypertext Markup Language (HTML) page, or media object that is received and processed via the browser 104. By way of a non-limiting example, the IME client 102 can comprise code, e.g., JavaScript™ or other applet, or be included in a Flash™ file of the media object where the code is attached to the media object.

The request 130 might be sent by the IME client 102 at any time. By way of some non-limiting examples, the IME client 102 might transmit the request 130 before receiving user input indicative of the user's desire to access the media object, or the IME client 102 might transmit the request 130 in response to receiving the user input. The request 130 can be made in connection with serving a media object, e.g., in connection with a requested media object or a media object that has been transmitted to the client, or at a time that the user views the media object, e.g., play of a video media object commences or is about to commence.

In accordance with one or more embodiments, the request 130 comprises a media object identifier (ID), a profile identifier (ID), and information about the user information 120, such as demographics, location, property etc. information. In accordance with one or more embodiments, the user information 120 can be in the form of a user ID, which can be used to retrieve additional user information, such as the demographics, web history, purchasing history, income, social networking information, such as social, work and/or familial relationships, location, and etc. user information. In any case, some or all of the user information 120 can be retrieved from the user computer, e.g., from a cookie or other file stored at the user computer. The user information can be used, in accordance with one or more embodiments, in identifying the one or more media enrichment presentation items for a media object.

The IME request 130 is received by an IME server 106. The IME server 106 can comprise a server computer executing IME server functionality described herein. In accordance with one or more embodiments, the IME server 106 retrieves information from a media repository 108 for use in retrieving one or more media enrichment presentation items. The IME server 106 uses the media object ID received with the request 130 to retrieve the information from the media repository 108. The information retrieved from the media repository 108 can comprise information associated with the media object, e.g., one or more categories, advertising topics, displayed topics, product offers and/or information identifying items, or search terms, for contextual information boxes.

The retrieved category and/or topic information can be used by the IME server 106 to identify one or more advertisements from display ad(s) source(s) 114, via request 142. In accordance with one or more embodiments, advertisers provide display ads and specify the manner in which each display ad is to be used, e.g., in connection with one or more topics and/or categories, and/or the manner in which the display ad is to be presented to the user. By way of a non-limiting example, display advertisements, or ads, can be provided by a display advertising source such as, for example and without limitation, Advertising Platform Technology (APT). Display ads can be fetched from an advertising source, e.g., an advertising source's ad server.

The IME server 106 can use the product information retrieved from the media repository 108 to retrieve one or more product offers from product offer(s) source(s) 112, via request 142. The product offers can correspond to items in the media object that can be offered for sale. Product offers can be retrieved, for example and without limitation, in connection with sellers that have online shops, and product offers can be aggregated into a shopping feed, such as the aggregated shopping feed from Yahoo!™ Shopping.

The IME server 106 retrieves profile information from a profile data store 110, via request 138, using the profile ID received with request 130. A profile contains information defining at least one experience. Each experience identifies each type of media enrichment presentation item that is to be presented in connection with the media object, the number of each type of media enrichment presentation item to be used with the media object, and the manner in which each media enrichment presentation item is to be presented to the user via browser 104, for example. The experience can include information defining such things as, without limitation, where each media enrichment presentation item is to be positioned relative to the media object, how long the media enrichment presentation item is to be presented, the type of user interaction including the type of user input expected from the user, etc. Where the media object is an image, such as a single image, a frame from a video or a slide from a slide show, the profile might contain information that indicates that the image is to be grayed out while the media enrichment presentation item is displayed, and that the user can move to the next media enrichment presentation item with a mouse over the media enrichment presentation item, or the profile information might indicate the length of time that a media enrichment presentation item is to be presented and that the next media enrichment presentation item is to be displayed automatically after the time has expired.

In accordance with one or more embodiments, in response 132 to the IME client request 130, the IME server 106 serves one or more media enrichment presentation items to the IME client 102 and/or browser 104. By way of a non-limiting example, the IME server 106 can return a link, e.g., a universal resource locator (URL) for each media enrichment presentation item, which the browser 104 and/or IME client 102 uses to request the media enrichment presentation item that is presented to the user in accordance with the experience defined by the profile associated with the profile ID provided in request 130. In an alternate embodiment, in response 132 to the IME client request 130, the IME server 106 retrieves the topics and category information from the media repository 108, transmits the retrieved information to the IME client 102, and the IME client 102 communicates with the display ad source(s) 114 to fetch the display ads in accordance with the profile associated with the profile ID. In such a case, the IME server 106 can be bypassed by the IME client 102 to communicate directly with source(s) 114. In yet another alternate embodiment, the IME server 106 can communicate product offer and contextual information to the IME client 102, so that the IME client 102 can bypass the IME server 106 to communicate directly to fetch product offers from the product offer source(s) 112 and the contextual information from the information source(s) 116 in accordance with the profile associated with the profile ID.

In the example shown in FIG. 1, the IME server performs requests 138, 142, 146 and 150 and receives responses 140, 144, 148 and 152 to generate response 132 after receiving request 130. In accordance with one or more embodiments, response 132 can be pre-packaged or predefined for a given media object, In accordance with such embodiments, requests 138, 142, 146 and 150 can be performed prior to receiving request 130, and some or all of response 132 can be stored, e.g., stored in media repository 108, In accordance with such embodiments, the media object ID received in connection with request 130 from the IME client 102 can be used to retrieve the media object's pre-packaged response, which can include links to one or more media enrichment presentation items associated with the media object ID.

In accordance with one or more embodiments, events are logged in log(s) 118, and information that is logged can be used for monetization and/or system improvement purposes. An event 154 can comprise some type of user interaction with a media enrichment presentation item and/or the media object. Information about an event 154 is received from the IME client 102 by the IME server 106, which logs the event 154 in log(s) 118. By way of one non-limiting example, where the user clicks on a media enrichment presentation item, information about the event 154 is transmitted by the IME client 102 and received by the IME server 106, which logs information about the user click in log(s) 118. By way of some further non-limiting examples, the logged information might include the time of the event as well as information about the user, e.g., user ID or other user information, information about the media object, such as the media object ID, the profile ID, and/or the media enrichment presentation item that the user clicked on. By way of another non-limiting example, an event 154 can comprise the serving and/or presentation of a media enrichment presentation item, and the information can comprise information about the serving and/or presentation of the media enrichment presentation item, including without limitation a media enrichment presentation item ID, time of the serving and/or presentation, profile ID, user ID, etc. As yet another non-limiting example, the request 130 received by the IME server 106 from the IME client 102 can constitute an event, and information about the event, the user ID, time, profile ID, etc. can be stored in log(s) 110.

In accordance with one or more embodiments, the log(s) 118 can include information about each user action, examples of such action include without limitation: a media object request, image activation by the user, media enrichment presentation item activation and/or deactivation by the user, ad click and user, mouse over media object. Information that is logged can include, without limitation, a timestamp of the user action, and impression ID, which may be an identifier that uniquely identifies the request received from the IME client 102, a campaign ID, which may be the profile ID, the media object ID, which may be a media fingerprint, the media object's URL, a package ID, which identifies the media enrichment presentation items for the media object and/or the request received from the IME client 102, the action, or actions, taken by the user, and/or mouse tracking information.

A media enrichment presentation item can be positioned over a media object, and a media enrichment presentation item type identifies the portion of the media object to which the media enrichment presentation item is associated. A point-type media enrichment presentation item is a type of media enrichment presentation item that is associated with a particular point in the media object. A box-type media enrichment presentation item is a type of media enrichment presentation item that is associated with an area in the media object. A global media enrichment presentation item is a type of media enrichment presentation item that is defined over the media object as a whole. Media enrichment presentation items can be extended to the video domain by, e.g., adding one or more timelines to the video for which the media enrichment presentation item is valid. By way of some non-limiting examples, a media enrichment presentation item of an image can be product media enrichment presentation item, which might be a point-type media enrichment presentation item, contextual search terms can be associated with the image and can be used to identify a media enrichment presentation item, which might be a point-type or global-type media enrichment presentation item, celebrity recognition in connection with the image might indicate a media enrichment presentation item, which might be a box-type media enrichment presentation item, brand detection in connection with the image might indicate a media enrichment presentation item, which might be a box-type or a global-type media enrichment presentation item, and/or an event associated with the image, such as a concert, sporting event, or other type of gathering, a broadcast event, media event, etc., which might be a global-type media enrichment presentation item. As further non-limiting examples, a media enrichment presentation item of a video might be a product media enrichment presentation item, which might be a time-based point-type media enrichment presentation item, contextual search terms can be used to identify a media enrichment presentation item that might be a time-based point-type or global-type media enrichment presentation item, a media enrichment presentation item based on celebrity recognition might be a time-based box-type or global-type media enrichment presentation item, a media enrichment presentation item indicated by brand detection might be a time-based box-type or global-type media enrichment presentation item, and/or a media enrichment presentation item indicated by an event might be a global-type media enrichment presentation item, which might optionally be time-based.

Figure 2:
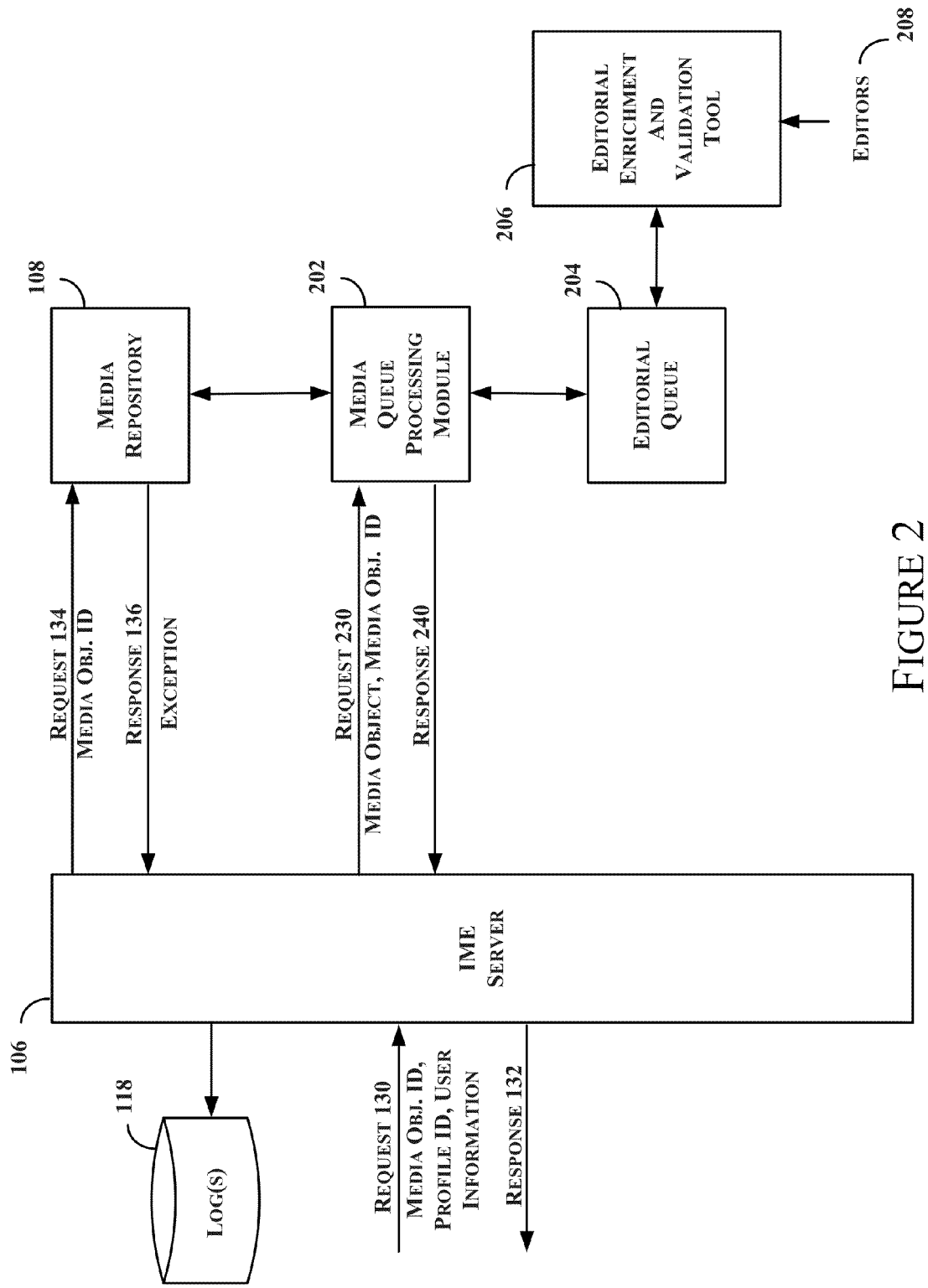
Figure 3A:
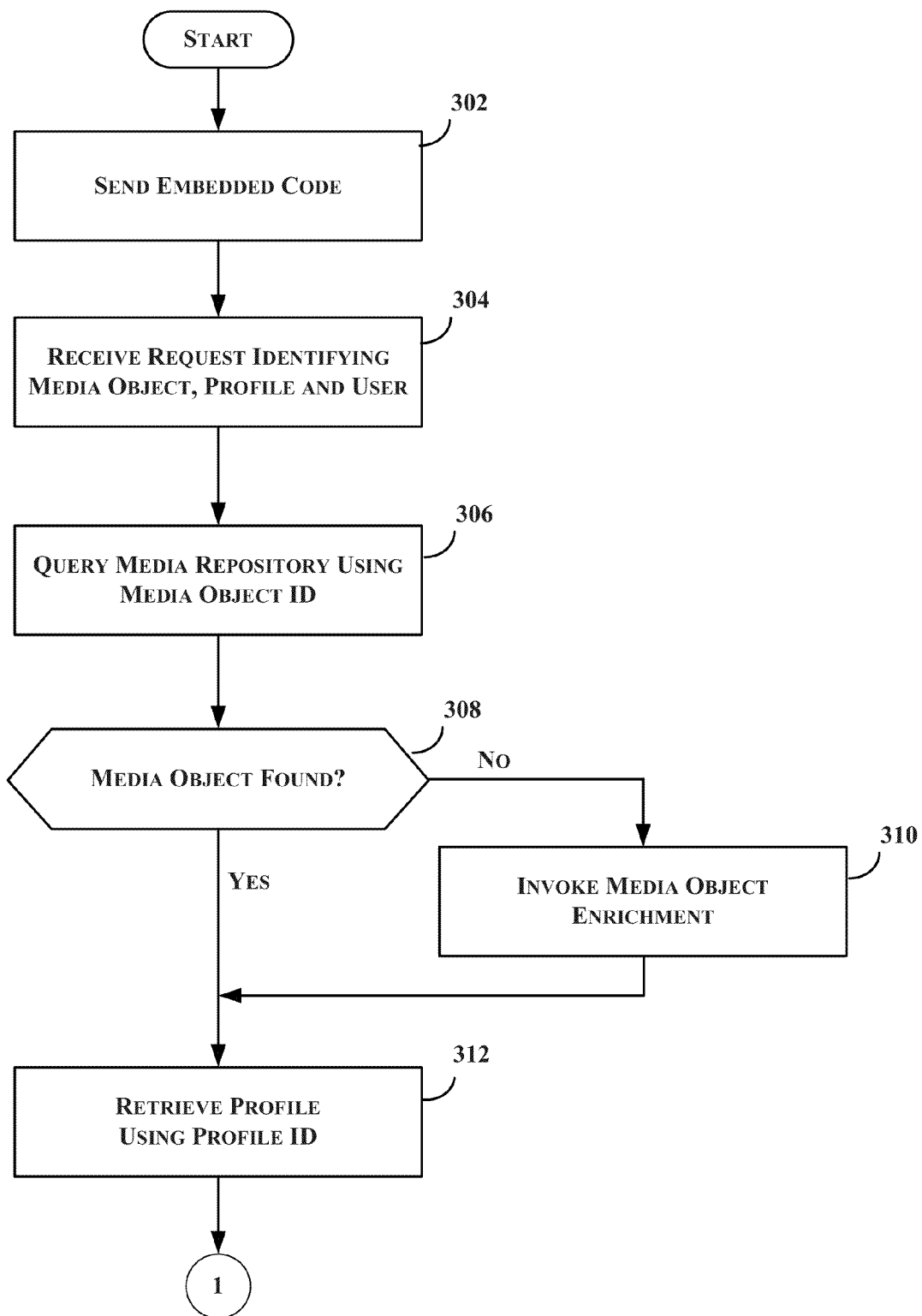
Figure 3B:
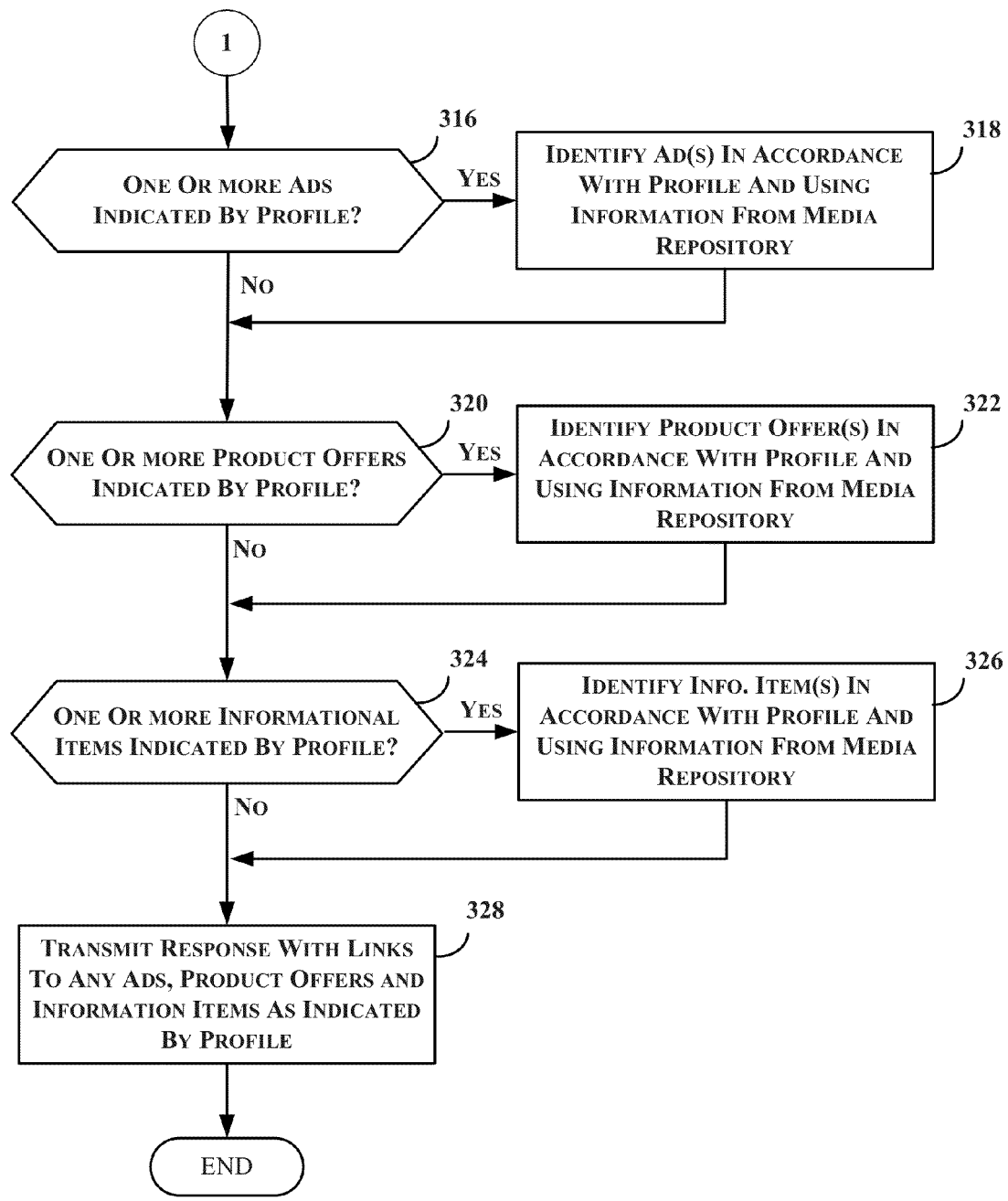

FIG. 3, which comprises FIGS. 3A and 3B, provides a media object media enrichment presentation item process flow in accordance with one or more embodiments. The process can be performed via IME server 106, for example. With reference to FIG. 3A, processing starts and proceeds, at step 302, to send embedded code in connection with the media object to a user computing device, e.g., a computing device executing browser 104. The code can be embedded in the web page. Alternatively, the code can be embedded in the media object. At step 304, a request identifying a media object, a profile and a user is received. By way of a non-limiting example, the request can be received by the IME server 106 from IME client 102 and can include a media object ID, a profile ID and a user ID, or other information that identifies the media object, the profile and the user. At step 306, the media repository 108 is examined, or queried, using the media object ID, to locate the media object's information in the media repository 108. A determination is made, at step 308, whether or not the media object's information was found in the media repository 108. If the media object's information was not found in the media repository 108, processing continues at step 310 to perform, or caused to be performed, media object enrichment. As is discussed in more detail below, the media object enrichment, which can be performed via media queue processing module 202 and optionally editorial enrichment and validation tool 206 (both of FIG. 2 discussed below), is performed to obtain the information for annotating the media object, and processing continues at step 312. If the media object's information was found in the media repository 108, processing continues at step 312.

At step 312, a profile is retrieved using the profile ID identified by the request received at step 304. At step 316 of FIG. 3B, a determination is made whether or not one or more ads are indicated by the profile retrieved at step 312. If so, processing continues, at step 318, to identify the one or more ads in accordance with the profile and using information from the media repository 108. The information used from the media repository 108 can include information identifying an advertising category, the property or website hosting the media object, as well as any other information to identify the one or more advertisements. Processing continues at step 320. If it is determined at step 316, from an examination of the profile, that no advertisements are to be used with the media object, processing continues at step 320.

At step 320, a determination is made whether or not one or more product offers are indicated by the profile retrieved at step 312. If so, processing continues at step 322 to identify the one or more product offers in accordance with the retrieved profile and using information from the media repository 108. The information used from the media repository 108 can include information identifying products, and/or the specific product offers, to annotate the media object. Processing continues at step 324. If it is determined at step 320 that the profile does not indicate that any product offers are to be used, processing continues at step 324.

At step 324, determination is made whether or not the profile indicates one or more contextual informational items, e.g., items for which contextual information, such as information retrieved via a web search, is to be presented, e.g., displayed, as a media enrichment presentation item in connection with the media object. If so, processing continues at step 326 to identify the one or more informational items in accordance with the profile and using information from the media repository 108. The information used from the media repository 108 can include information identifying the items, e.g., brands, logos, people, entities, etc., for which the contextual information is to be presented, and/or search terms to be used to retrieve the contextual information, via a web search. Processing continues at step 328. If it is determined at step 324 that no informational items are indicated by the profile, processing continues at step 328. At step 328, a response is transmitted with links to any ads, product offers and informational items in accordance with the profile.

Media Object Enrichment Registration

Where the media object ID received in connection with the request 130 is not found in the media repository 108, the media object can be registered in the media repository 108, such that the information for use in enriching the media object is available. FIG. 2 provides an overview of media object registration in accordance with one or more embodiments of the present disclosure. As discussed above, the request 130 is received by the IME server 106 from the IME client 102, and the media object ID is used in request 134 to media repository 108 to retrieve the media object information associated with the media object ID. Response 136 comprises an error, or exception, indicating that the media object ID does not exist in the media repository 108. Information about the exception is logged as an event in log(s) 118, and an enrichment mechanism is launched to generate the information for the media object identified by the media object ID from request 130.

In accordance with one or more embodiments, the media object's enrichment comprises identifying the information to be used to identify one or more media enrichment presentation items for the media object. Components 202, 204 and 206, which can be executed on the same or another server computer as the IME server 106, can be used to perform some or all of the enrichment mechanism. IME server 106 makes a request 230 of media queue processing module 202. The request 230 can include the media object, or a link to the media object, and the media object ID provided with request 130.

Where a duplicate or near duplicate of the media object exists, the duplicate or near duplicate can be used in place of the requested media object, thereby avoiding the enrichment process. A deduplication mechanism is invoked by module 202 to determine whether or not the requested media object is a duplicate, or near duplicate, of another media object identified in the media repository. If an existing media object is determined to be a duplicate or a near duplicate of the media object identified by request 130, the requested media object and the identified media object are associated in the media repository, and the identified media object is used for responding to the IME client request 130, as discussed above. Response 240 can notify IME server 106 that a duplicate or near duplicate media object was found, and IME server can proceed by using the existing media object's media object ID or the association between the duplicate media objects to proceed as discussed hereinabove.

If a duplicate or near duplicate media object is not identified, module 202 proceeds with enrichment in connection with the requested media object. The requested media object metadata is obtained, e.g., from the media object source, such as Reuters, Getty, etc. The metadata can include, without limitation, title, description, category, etc. A classifier uses the metadata information to recommend at least one category and/or topic to be used in identifying one or more advertisements. Module 202 can invoke a visual analyzer to identify objects/items in connection with and/or contained in the media object, e.g., such items can include one or more instances of a brand or logo, person, object, product, etc., and to identify a region of the media object to be associated with each item. As discussed herein, the region might be a point, a box, or the entire image. The information generated by the classifier and the visual analyzer are stored in the media repository 108 for the requested media object, which is identified by its media object ID in the media repository 108. In addition to or as a substitute for the computer-generated enrichment information, enrichment can use other sources of enrichment information, such as crowd sourcing, the owner/provider of the media object and/or one or more human editors. Crowd sourcing can be used to obtain input from a number of users, e.g., using crowd sourcing to obtain input from a number of users identifying items or objects found in or otherwise associated with the media object. A crowd sourcing internet marketplace, such as Amazon Mechanical Turk, that provides a networking marketplace for requesters to request one or more performers to perform identified tasks, such as identifying media object metadata, objects or items from the media object, etc. The originator and/or provider of the media object can also be used for input identifying metadata and/or object/items in connection with the media object.

Another tool that can be used in accordance with one or more embodiments is editorial enrichment and validation tool 206, which provides a user interface (UI) for use by one or more human editors. Module 202 can be used to place an entry in editorial queue 204 for each media object that is to be viewed by one or more human editors. The entries in queue 204 can be prioritized, so that priority entries are handled first by the human editors. By way of a non-limiting example, the entries can be prioritized based on a prediction of the number of views that each media object is likely to have, which might be determined based on the web site, or web page, with which the media object is to be served, e.g., based on the popularity of the web page/site, a prediction of the number of views the media object is likely to have, etc.

Editorial enrichment and validation tool 206 provides a user interface for users, referred to as human editors, 208. The user interface allows a human editor 208 to view the media object, to validate the computer-generated information, e.g., advertising topics and/or categories, detected objects, etc., generated via module 202. Additionally, the user interface can be used by a human editor to identify advertising topics and/or categories, objects and/or contextual information associated with the media object. The information about the media object that is received via module 202 and the input from human editors, crowd sourcing, the owner/provider of the media object and/or the computer-generated enrichment information is stored in media repository 108.

Figure 4A:
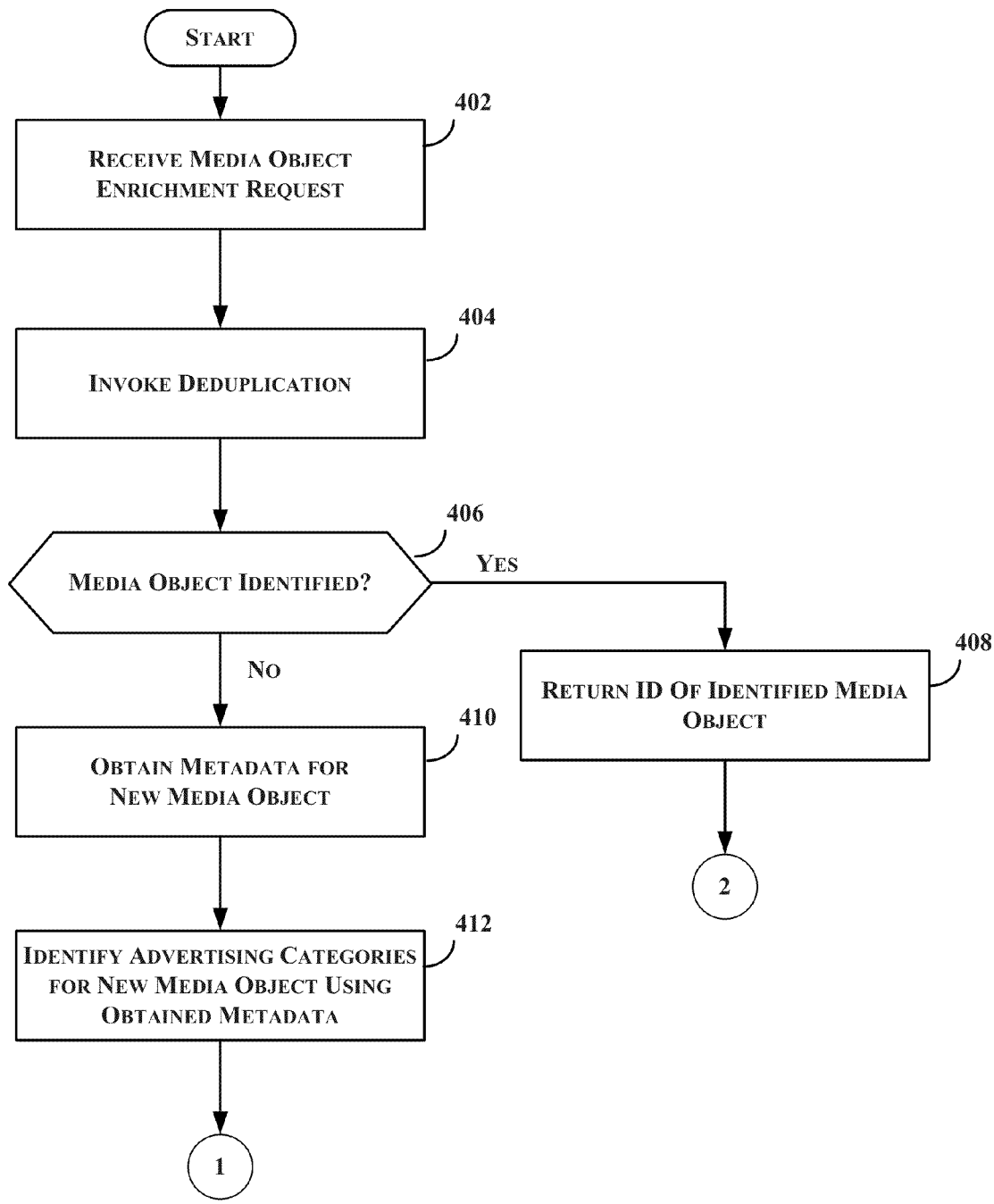
Figure 4B:
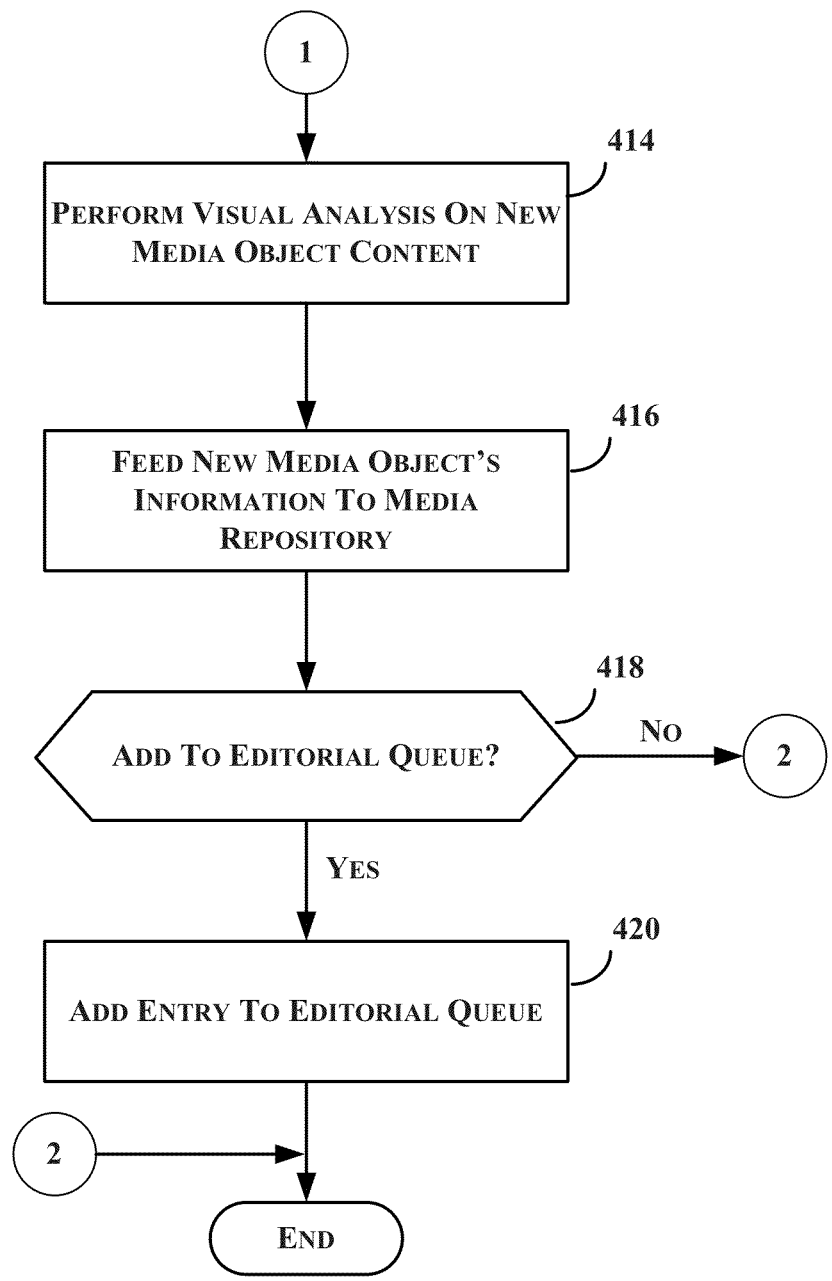

FIG. 4, which comprises FIGS. 4A and 4B, provides an exemplary media object enrichment process flow in accordance with one or more embodiments of the present disclosure. The process can be performed via media queue processing module 202, for example. Processing starts and proceeds to step 402 to receive the media object enrichment request, e.g., from the IME server 106. A deduplication process is invoked, at step 404, to locate a duplicate or near duplicate of the media object identified in the request received at step 304 of FIG. 3A. A determination is made at step 406 whether or not a media object exists, for which information is identified in the media repository 108, that is a duplicate or near duplicate of the media object identified in the request received at step 304. If so, processing continues at step 408 to return the media object ID for the duplicate or near duplicate media object found in the media repository 108, and processing ends.

If it is determined, at step 406, that there is no duplicate or near duplicate of the media object identified in the request received at step 304, the media object identified in the request is a new media object, e.g., a media object new to the system or newly uploaded to the web or other network by a user, and processing continues to 410 to obtain metadata for the new media object. The metadata can be obtained from the source of the media object or other metadata repository. The metadata can comprise, for example, title, description, category, etc. At step 412, advertising categories are identified for the new media object using the obtained metadata. The advertising categories can be obtained or identified from an advertising classifier using the title, description, category and/or other metadata information obtained at step 410.

At step 414 of FIG. 4B, visual analysis is performed on the media object content to identify items contained in the media object content, e.g., logo, such as a brand or manufacturer's logo, people, object, product, etc. The visual analysis can be performed using a computer vision, or machine vision, tool, which may extract information from the media object, including its visual and/or audio content, and analyze the extracted information to identify one or more object or items in connection with the media object, e.g., identify one or more objects depicted in the media object content. At step 416, the information collected from steps 410, 412 and 414 is fed to the media repository 108 for storage. At step 418, a determination is made whether or not the media object is to be added to the editorial queue for review by a human editor. In accordance with one or more embodiments, any media object not found in the media repository 108, can be added to the editorial queue 204. Alternatively, a decision to add a media object to the editorial queue 204 can be based on such things as the number of media objects in the queue 204, the availability of human editors, and/or a measure, or measure, of the media object's priority relative to other media objects that are to be enriched, e.g., the media objects in editorial queue 204 as well as other new media objects. It should be apparent that any other factor, or factors, can be considered at step 418. In accordance with one or more embodiments, the media object's priority determines the location of the media object in the queue relative to other media objects in the queue. By way of a non-limiting example, the media object is placed in the queue in a position, e.g., above, other media objects of lower priority, so that the higher-priority media object is processed before the lower-priority media objects. If the media object is added to the editorial queue, the media object can be reviewed and by one or more human editors 208 using editorial enrichment and validation tool 206, for example. Examples of a user interface that can be provided by tool 206 for use by the human editors 206 are discussed below.

Figure 5:
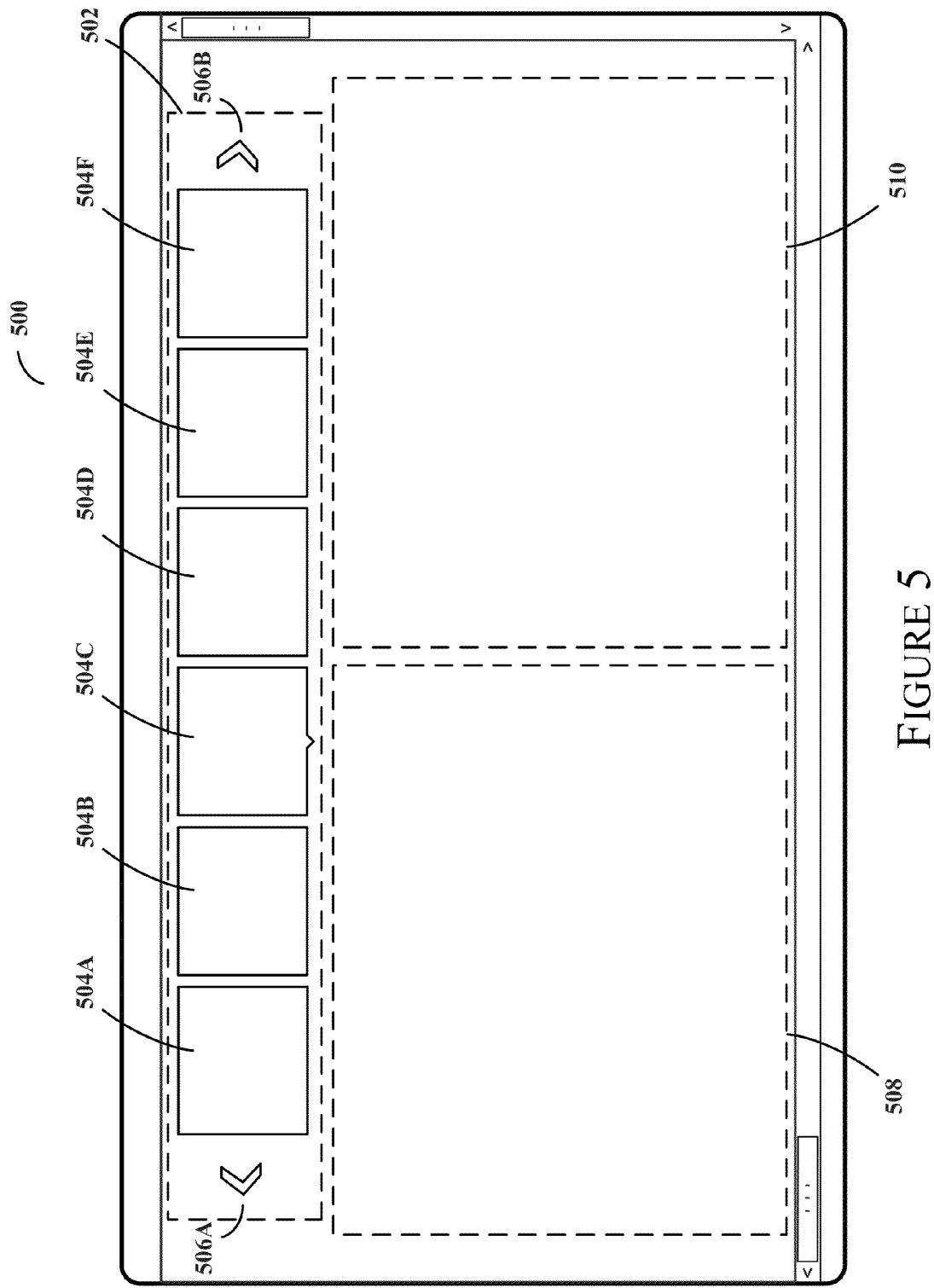

A media object, or media objects, added to the editorial queue 204 can be reviewed and enriched, in accordance with one or more embodiments, by human editors 208 using a user interface 500 of FIG. 5. The user interface 500 includes a portion, or region, 502, which displays thumb nail images, e.g., 504A-504F, associated with one or more media objects. The human editor 208 can scroll through the thumbnail images using controls 506A and 506B. The editor 208, or user, can select a media object that has an entry in the editorial queue by selecting a thumbnail image associated with the media object from portion 502, e.g., using a pointing device such as a mouse or cursor controls. In the example shown in FIG. 5, thumbnail image 504C is selected. In the example, the appearance of the selected thumbnail image is different from the other thumbnail images shown, e.g., the bottom edge has a pointer pointing in the direction of portions 508 and 510 of user interface 500.

Portion 502 can include one or more images associated with a media object. By way of one non-limiting example, where a media object is a video or slideshow, portion 502 can include one or more frame images or slide images in connection with the media object.

In the example shown in FIG. 5, the dashed lines are used to identify portions of the user interface, and may or may not appear in the user interface. It should be apparent that the size and/or location of a portion, region or area shown in the example is illustrative and that portions 502, 508 and 510 may located elsewhere and may have a different appearance without departing from the scope of the present disclosure.

Portion 510 displays a media object's image corresponding to the selected thumbnail image 504F. Portion 508 includes various controls and input fields for use in identifying media enrichment presentation items for a selected media object, e.g., the media object corresponding to the image shown in portion 510 and corresponding to the selected thumbnail image in portion 502. As is described in more detail below, the editor 208 can interact with the image presented in portion 510 and the controls and fields in portion 508 to specify information to be stored in the media repository 108 for the media object, and annotating the media object.

Figure 6:
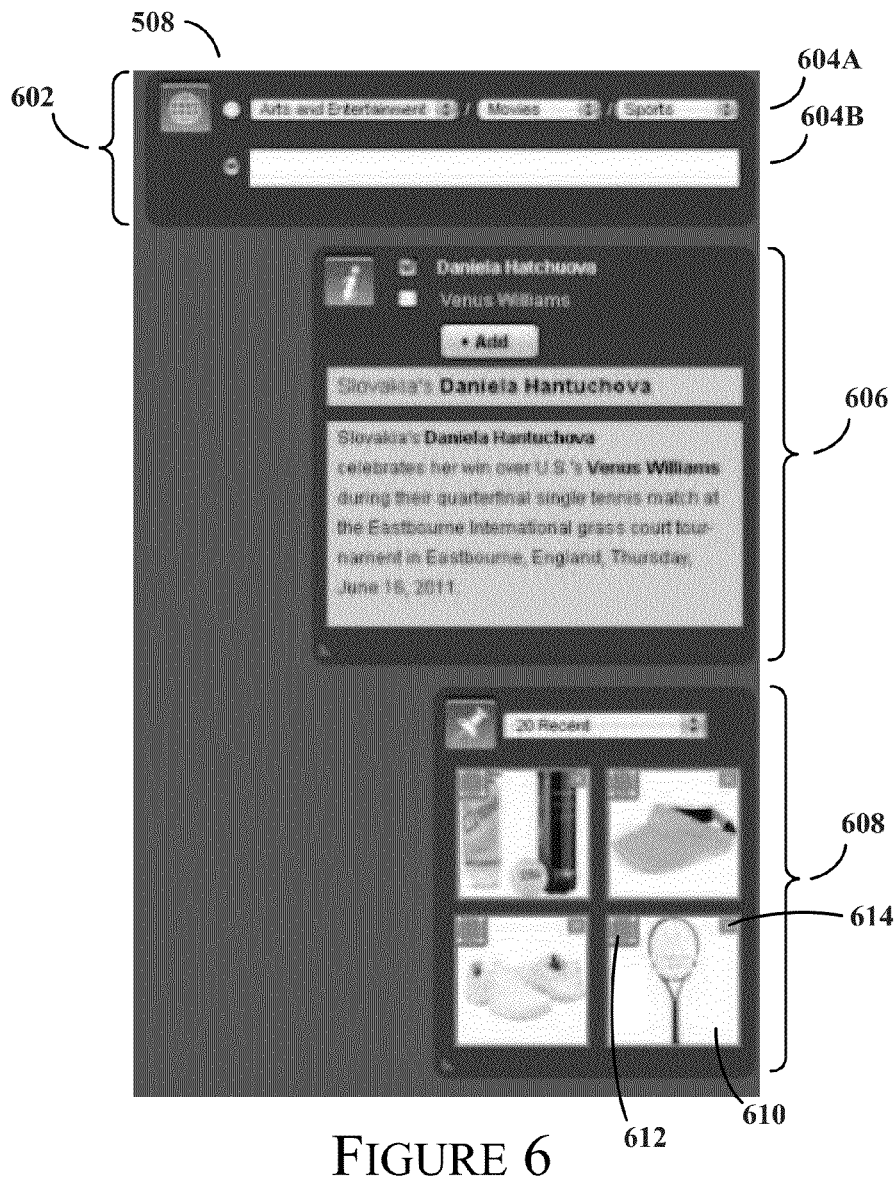
Figure 7:
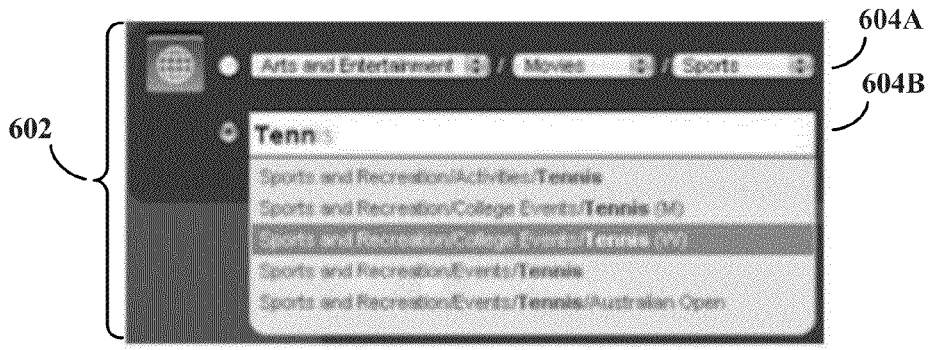

FIG. 6 provides an example of a user interface portion 508 in accordance with one or more embodiments of the present disclosure. One or more categories and/or topics associated with the media object can be specified using area 602. The human editor can select from one or more menus 604A and/or provide free form input 604B. As shown in the example of FIG. 7, in response to text entered by the editor 208, a menu can appear with selectable categories and/or topics.

Referring again to FIG. 6, area 606 can be used by the editor 208 to specify various items of contextual information. The editor 208 can select an item and add the item as part of the information about the media object stored in the media repository 108. Area 606 includes a preview of the contextual information for the item.

Area 608 provides an example of items, for use in identifying other media enrichment presentation items, e.g., one or more product offers and/or advertisements, in connection with the media object. In the example, four items are shown. For each item, an image 610 is provided, together with a control 614 for removing the item and a control 612 to specify a boundary within the image, e.g., point, bounding box, whole image, for the media enrichment presentation item.

Figure 8:
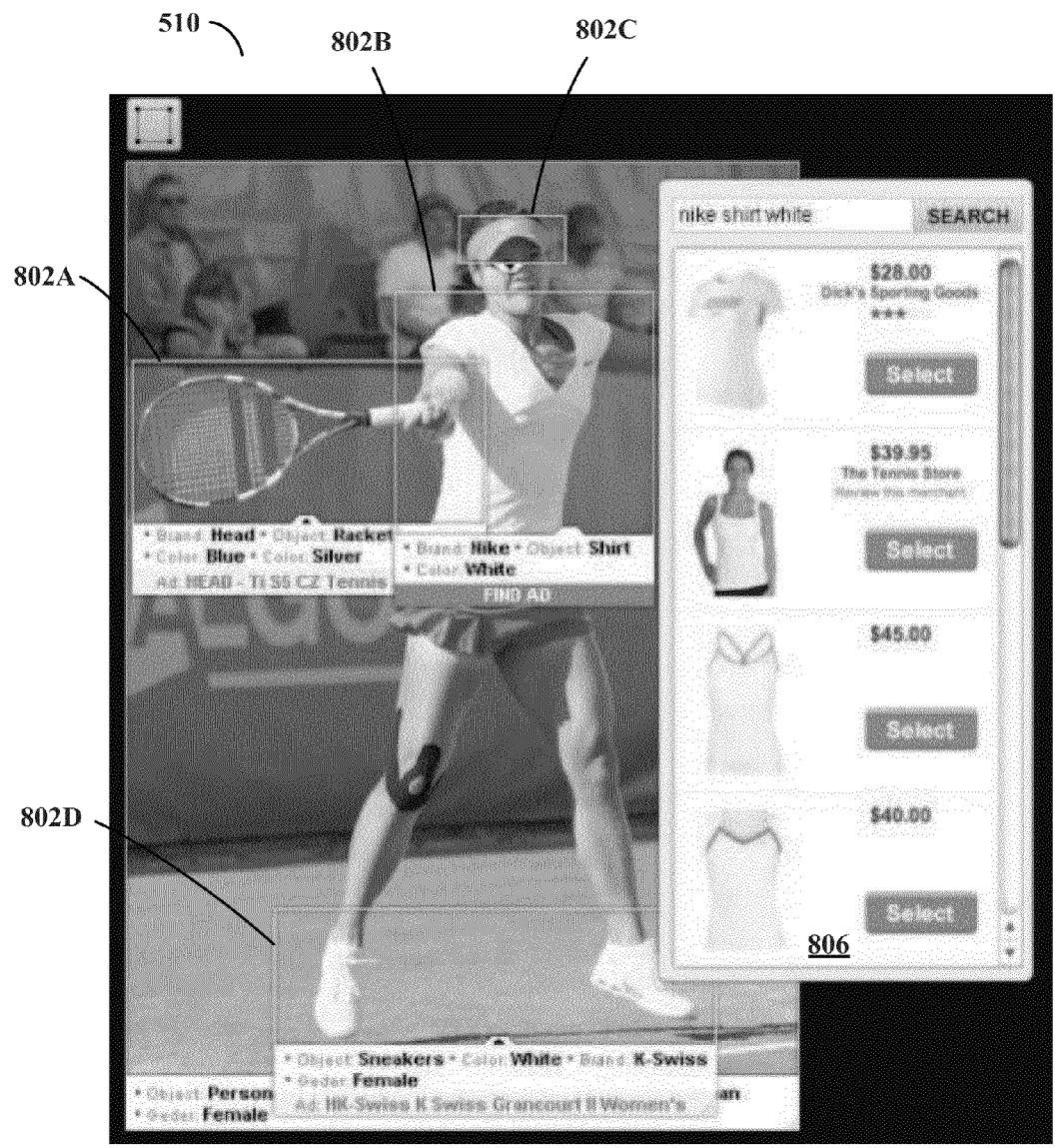

FIG. 8 provides an example of a user interface portion 510 for use in accordance with one or more embodiments of the present disclosure. The example shows the information about media enrichment presentation items selected in connection with the tennis racket and shoes shown in the image, as well as bounding boxes 802A-802D, each of which corresponds to one of the items being annotated. By way of a non-limiting example, each media enrichment presentation item might be presented to the user as the user moved the mouse within the bounding box, and/or the bounding box can specify the area in which the media enrichment presentation item is presented to the user. In the example shown in FIG. 8, media enrichment presentation items associated with bounding boxes 802A and 802D have been selected, and a bounding box 802B is specified around the player's shirt. Panel 806 allows the editor 208 to select a specific item, e.g., product offer or advertisement, for annotating the media object. Panel 806 allows the editor 208 to perform a search for the product by entering search terms and selecting the search button, and to review the set of search results. The search might be forwarded to one or both of the advertisement and product offer sources. In the example, the search term input returned a set of items, each of which can be selected by the editor 208.

Figure 9:
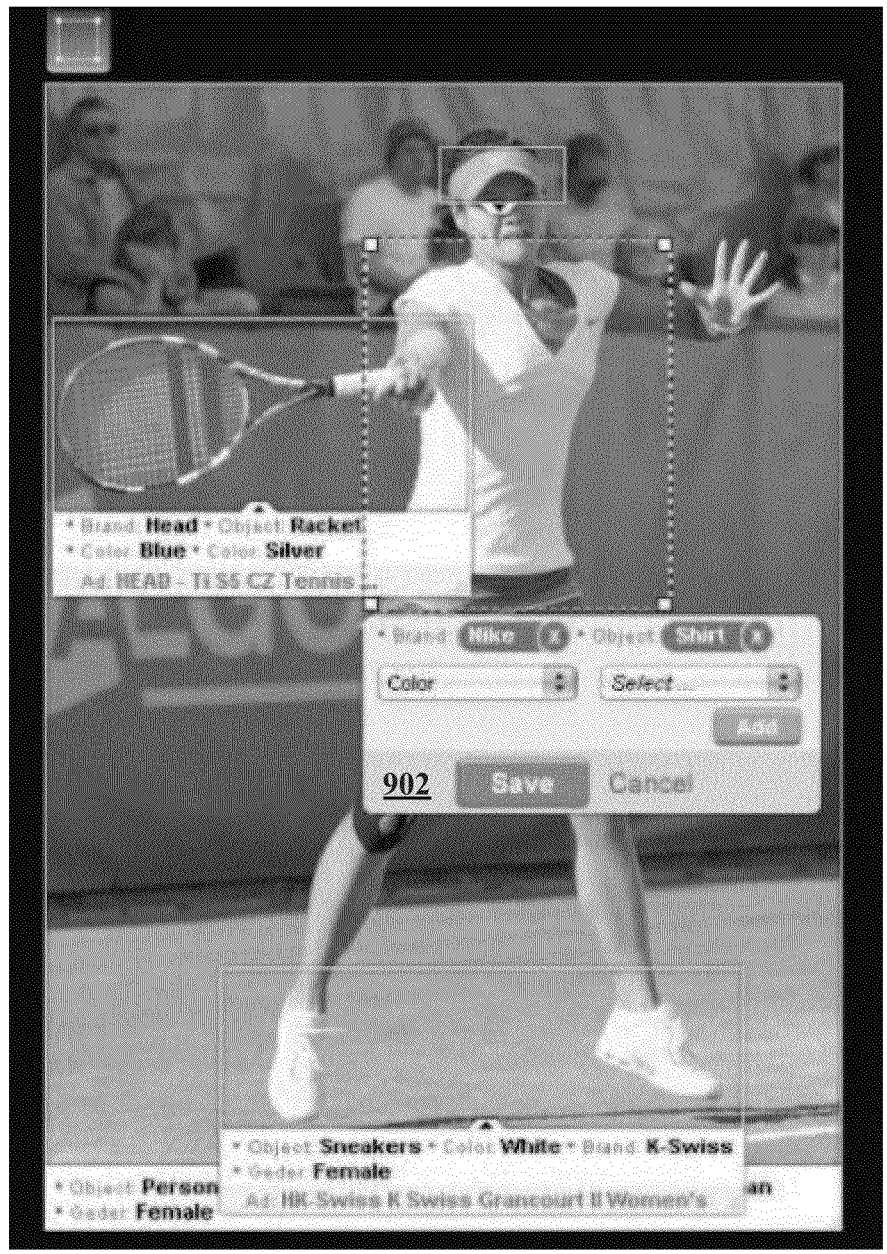

FIG. 9 provides another example of user interface portion 510 for use in accordance with one or more embodiments of the present disclosure. In the example shown in FIG. 9, panel 902 allows the editor 208 to select the item based on brand, object and color.

EXAMPLE ONE

The following provides examples of requests received from a client, e.g., IME client 102, and the IME server 106 responses. In the example, the IME client 102 is code, e.g., JavaScript™, embedded in a web page, and the embedded code is executed at the time the web page is loaded. As discussed herein, the IME client 102 can be embedded in, for example, a media object image. The IME client 102 sends the request to the IME server 106 to retrieve the information associated with the media object that is to be presented in connection with the web page. In the example, user information, e.g., one or more cookies containing a user ID and/or other user information, as well as property-specific cookies is sent to the IME server 106 with the request. The following provides an example of a request received from IME client 102.

http://yima.yahoo.com/getImageInformation/?id=abcd-efgh-hijk-lmnop&source=abcdef123&spaceId=abcdef123&ultPageviewId=abcdef123

The user ID is retrieved from the cookie transmitted with the request. The id parameter provides the ID of the media object, e.g., the unique identifier of the media object or image URL. The media object ID is used to retrieve the media object's information, e.g., from media repository 108. The source parameter is a string value that can be used to track the origin of the media object, e.g., a Yahoo!™ property such as without limitation OMG!™, Yahoo!™ News, etc., in connection with which the media object is served. Optionally, a representative value, e.g., a value that is mapped to a given source or property, which can be used instead of the actual property name, e.g., IMA_YN is representative of Yahoo!™ News. The spaceId parameter identifies an advertisement location on the web page. In accordance with one or more embodiments, the space ID is assigned to the IME experience to present one or more advertisements. In the ultPageviewId parameter, ult refers to Universal Link Tracking, and the parameter specifies an ID associated with the type of user interaction information that is to be logged.

The IME server 106 responds to the request from the IME client 102. By way of a non-limiting example, where the media object specified by the media object ID exists in the media repository 108, the response from the IME server 106 comprises data, e.g., JavaScript™ Object Notation (JSON), extensible markup language (XML), hypertext markup language (HTML), etc. data, comprising: image meta data, such as title, description, etc., a list of the one or more persons, events, titles, products from Y! Shopping, etc., topics associated with the media object. By way of a non-limiting example, each product-type media enrichment presentation item includes information such as title, description, price, product URL, bounding box, URL of product image, etc. The response can further comprise a list of categories, which can be used to request one or more advertisements. The following provides an example of a response by the IME server 106:

```
{
"uuid" : "abcd-efgh-hijk-lmnop",
"topics" : ["Sports and Recreation/Events/Basketball/NBA","Sports and
Recreation/Events/Basketball/NBA/Dallas Mavericks",""],
"title" : "Dallas Mavericks power forward Dirk Nowitzki looks for a rebound against
the Miami . . . ",
"description" : "Dallas Mavericks power forward Dirk Nowitzki looks for a rebound
against the Miami Heat in the second half during Game 6 of the NBA Finals
basketball series in Miami, June 12, 2011.",
"annotations" : [
{"annotation-type":"global", "annotation_entity_type":"person", "value":"Dirk
Nowitzki"},
{"annotation-type":"bounding_box", "left":11820, "top":7874, "height":57637,
"width":53900, "annotation_entity_type":"product",
"productJSON":{"product_id":"885595081","product_name":"Autographed
Basketball", . . . other parameters such as price, product_url, product_image_url . . . }
}
```

Some non-limiting examples of categories that might be supplied by the IME server 108 include:

Category="Automotive/Cars and Trucks/New" and Advertisement Displayed="Banner advertisement for Dodge™ Charger™"

Category="Technology and Electronics" and Advertisement Displayed="Banner advertisement for Sony™ Playstation™"

Category="Travel/Destinations/North America/United States" and Advertisement Displayed="Banner advertisement for Southwest Airlines"

Category="Sports and Recreation/Events/Football" and Advertisement Displayed="Banner ad from a TV channel about a related sports event"

In addition to a request for media object information, the IME client 102 can transmit one or more requests for the IME server 106 to log information, e.g., in log(s) 108, about user interactions in connection with an IME experience. By way of some non-limiting examples, the user interaction can be one or more of the following, the list is not exhaustive and the possibilities for user interactions may be based on the IME experience:

Mouse hover on the media object image;
Click on a part of the media object image;
Click on the media object image;
Hover/Click on a popover advertisement;
Hover/Click on an advertisement at the bottom of the image media object;
Hover/Click at the overlay showing an ad on top of the image media object;

By way of some further non-limiting examples, each user interaction can be logged as a separate POST request, or the IME client 102 can collect the user interaction information for the user interactions for a given period of time, and send the collected information to the IME server 106 in a single POST request to the server.

FIG. 10, which comprises FIGS. 10A-10C, provides examples of information that can be sent in connection with a logging request to IME server 106. FIGS. 10A and 10B provide examples of POST requests with information associated with a single user interaction. FIG. 10C provides an example of a POST containing information about more than one user interaction.

EXAMPLE TWO

The following example includes an example using a campaign that defines properties of an IME experience, or experience. In the example, a request is initiated from a user's browser by the IME client 102. As discussed above, such a request can contain a space ID, URL, property component ID, a universal link tracking (ULT) page view ID, media object ID, and user-specific information, which can be a cookie or other file or information stored on the user's computer. As with the example above, the request include the URL of the server, e.g., IME server 106, and server-side program. The property component ID comprises information identifying a property, e.g., a web site, web-based service, web-based product, etc. The ULT universal tracking page view ID is an identifier that can be associated with user information that is to be or is being logged by the server.

Upon receiving a request, the IME server 106 performs a lookup in the media repository 108 using the media ID. If the image is registered in the media repository 108, the response from the media repository 108 can identify one or more advertising topics, one or more product offers, contextual metadata, such as without limitations points of interest or other entities), brands, etc. If the response from the media repository 108 indicates that the media object is registered in the media repository 108, a campaign is identified.

In accordance with one or more embodiments, a campaign defines the properties of an in-media enrichment experience, for a particular property, such as a web site, web-based product etc., which is identified by its space ID and property component ID. A campaign can be defined for each experience on a particular component of a property, for example, each photo gallery being a component of an image search property. The following are examples of software properties that can be defined for a campaign:

---
campaign ID: int
campaign_name: string
space ID: int
{component ID}: int | 'default'
{base_url }: string[ ]
start_date: timestamp
end_date: timestamp
experience ID: int
traffic: float | 'default'
experience_template: json-object
---

A campaign identifier, campaign ID, is a unique identifier for a campaign, and a campaign name, campaign_name, provides a name, e.g., a user friendly name, for the campaign, which might be used with the campaign identifier in reports for ease of identification by someone reviewing the report, for example.

In accordance with one or more embodiments, a property is a portal available on the web, e.g., Yahoo!™ has various properties including without limitation images.yahoo.com, sports.yahoo.com, omg.yahoo.com. Each property serves web pages, which include one or more positions, or components, which may have an associated media enrichment presentation item, or items. A component identifier, component ID, is an identifier which can be used to identify a particular page, or section or area, of a property's web page. A property can include media enrichment presentation items on multiple locations within the property. The component ID can be used to differentiate between these locations. A variable, base url, identifies a base URL, e.g., shopping.yahoo.com, of the property where the one or more media enrichment presentation items are served.

A campaign can have start and end timestamps, start date and end date timestamps, which indicate the time, such as the date and optionally time of day, which the campaign starts and ends. The campaign can have a unique identifier, such as an experience identifier, experience ID. In accordance with one or more embodiments, the experience ID corresponds to the profile identifier, or profile ID.

A float variable indicates the percentage of traffic to allocate to the campaign, e.g., 0.32 or 32%. An experience template contains a string a JSON object which can be used to configure the IME server(s) to render the experience to the user.

By way of a non-limiting example, the following procedure can be used to look up and select a campaign for a given IME client request:

1. Values for the space ID, component ID and the current date are used as criteria to identify active campaigns. The current date can be determined from timestamp information calculated in connection with the request received from the IME client 102, for example. The campaign start and end timestamp can be obtained from an ad server, for example. If a specific value for the component ID is not provided as criteria, a default component ID value can be used. The campaigns that are selected have space ID and component ID that match the selection criteria, a start date that is less than or equal to the current date, and an end date that is greater than or equal to the current date.
2. If more than one campaign is identified, one campaign can be selected from the set of available campaigns. If the user is a 'returning' user, the campaign that was selected previously for the user can be selected, where the campaign is still active, and the user is still in the same session. In so doing, it is possible to avoid exposing the user to different experiences in a single session. Of course, it is possible to select a different experience so that the user can be exposed to different experiences in a single session. Where there is no active session and more than one campaign is available, an active campaign can be selected using the traffic attribute or property discussed hereinabove.
   2.1 Each component on a property has a defined default campaign. By default, all traffic can be send to that campaign.
   2.2 All additional 'active' campaigns, will receive a proportion of the traffic. The exact amount depends on the value specified in the traffic attribute. E.g. [0 . . . 1].
   2.3 The sum of all additional campaigns should not exceed '1'.

3 Once a campaign is selected, the corresponding experience is fetched, to prepare the response to the browser. The fields of the response are controlled using the template field.

4. Each experience has a unique experience ID, a matching template, and implementation. Experience ID can be re-used for different campaigns, across different components, and properties.

A user session can be defined as the consecutive time period, during which a user is active on a particular property. A session can expire after one hour of inactivity. Examples of software properties, or values, which can be tracked for a user: session ID, user ID, space ID, component ID, campaign ID and a "touched" timestamp. The touched timestamp can be used to identify the time that a user interacted with media enrichment presentation item, e.g., an advertisement, product offer, contextual information, etc.

FIGS. 11-19 provide examples of advertisement and product offer media enrichment presentation items in accordance with one or more embodiments of the present disclosure. The media object and media enrichment presentation items shown in these examples can be displayed in a browser window of browser 104, for example.

Figure 11:
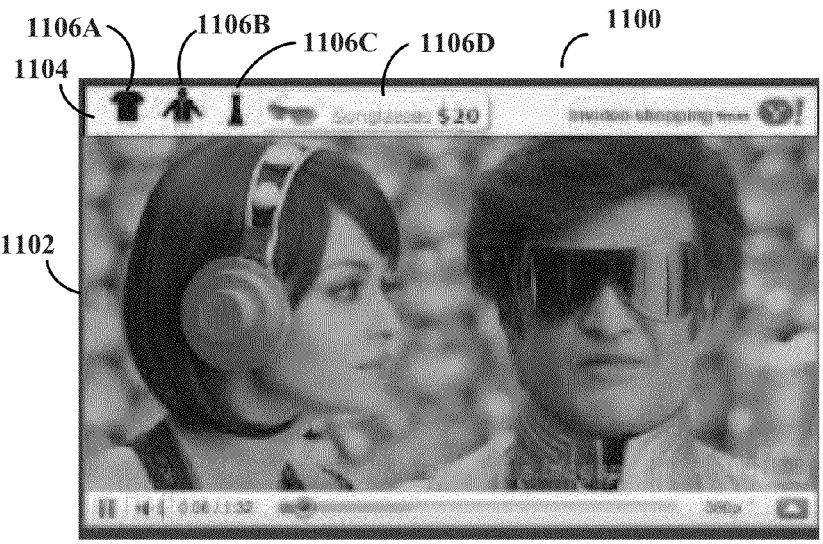

With reference to FIG. 11, product offers and/or advertisements annotate an audio/video media object as the media object plays in a media player window 1102. Each product offer and/or advertisement is represented as an icon 1106, which can be selected by the user to obtain additional information, in media enrichment presentation item area 1104. Icon 1106D corresponds to the sunglasses worn in the image frame presented in the media window 1102. Icons 1106A-1106C were presented to the user in one or more previous frames of the media object, for example.

Figure 12:
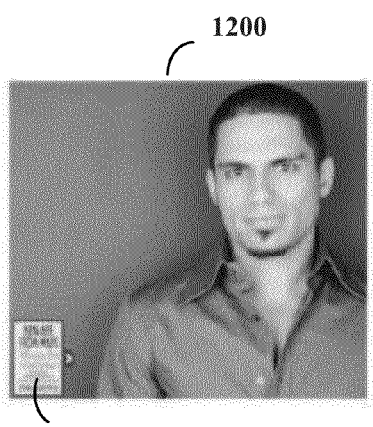
Figure 13:
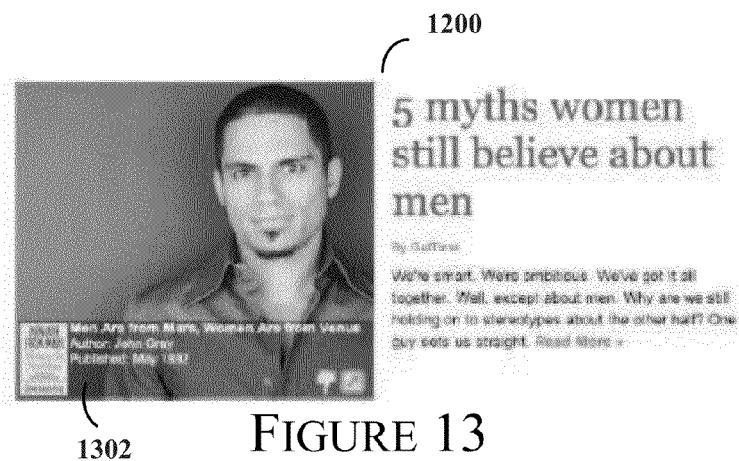

FIGS. 12 and 13 provide an example of a product offer annotating a media object 1200, which includes an image and an article. A product offer 1202, for a book, e.g., the book entitled "Men Are From Mars, Woman Are From Venus," annotates the media object 1200, and relates to the context of the media object 1200, which contains text related to myths that women still believe about men. In accordance with one or more embodiments, the profile associated with the profile ID identified in the request received by the IME server 106 from the IME client 102 includes information to indicate that where the arrow included with the media enrichment presentation item product offer 1202 is clicked on or otherwise selected by the user, the media enrichment presentation item's appearance changes from the media enrichment presentation item 1202 to the appearance of media enrichment presentation item 1302 shown in FIG. 13. The user can select the product offer 1302 to obtain additional information, such as information to obtain the book.

Figure 14:
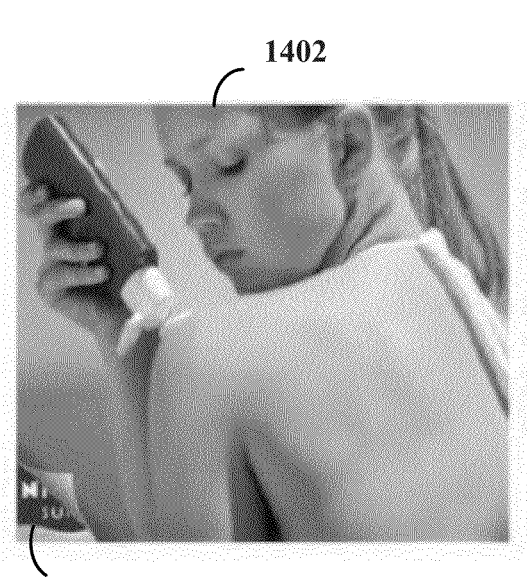
Figure 15:
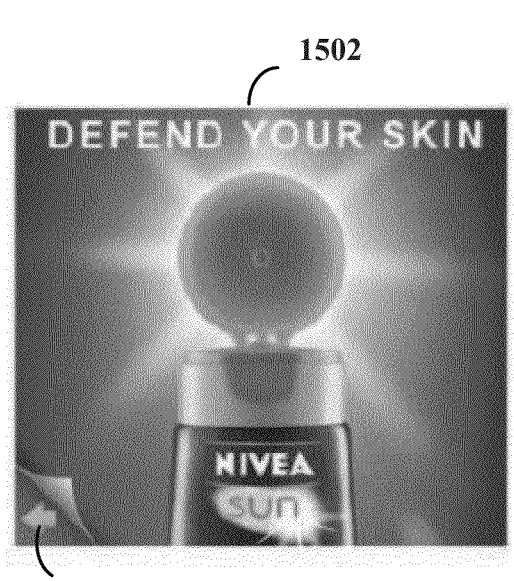

FIGS. 14 and 15 provide an example of a product offer annotating a media object 1400, which includes an image and an article. A product offer 1404, for a manufacturer's sunscreen, annotates the media object 1400, and relates to the context of the media object 1400, which shows a person applying sunscreen and includes information regarding new rules for sunscreen. In accordance with one or more embodiments, the profile associated with the profile ID identified in the request received by the IME server 106 from the IME client 102 includes information indicating that the media enrichment presentation item 1404 initially appears under a folded-up corner, lower left corner, of the image; and where the media enrichment presentation item product offer 1404 is clicked on or otherwise selected by the user, the image 1402 is replaced with an image of the manufacturer's sunscreen product, with the lower left corner folded up to display an image 1504 of an arrow to indicate that the user can return to the image 1404 by clicking on or otherwise selecting the media enrichment presentation item 1504. The user can select the product offer 1502 to obtain additional information, such as information to obtain the manufacturer's sunscreen.

Figure 16:
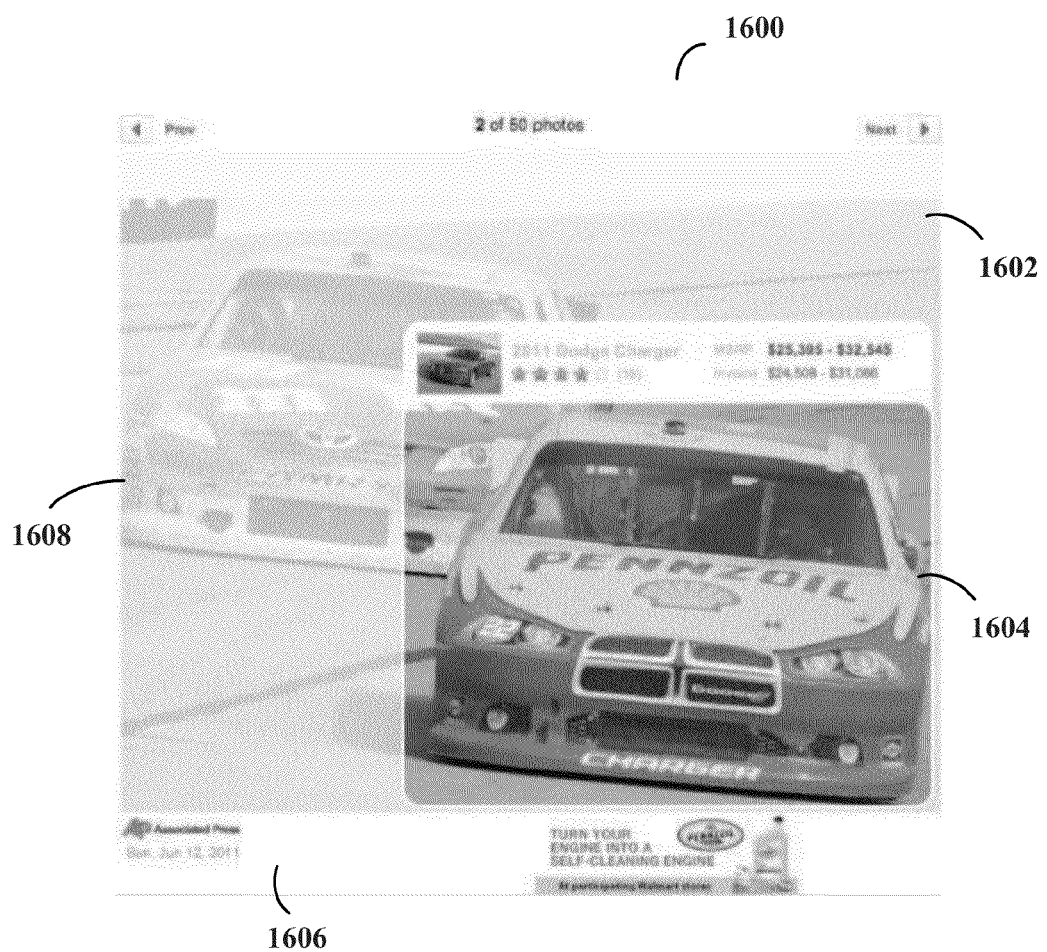

FIG. 16 provides an example of multiple media enrichment presentation items with a slide show media object 1600. The slideshow media object 1600 comprising multiple photographs or images. In the example shown, photograph 1602, a photograph of a race car, which is one of fifty photographs, is displayed. Additionally and in accordance with the profile used, the photograph 1602 is displayed together with an advertisement media enrichment presentation item 1606 for motor oil, and a product offer 1604 for an automobile similar to that of the race car, e.g., a Dodge Charger. In the example, the advertisement 1602 appears along the bottom of the photograph 1602. Additionally, in the example, the photograph 1602 is grayed out, and the product offer 1604, which is not grayed out, is superimposed over and covering a portion of the photograph 1602, so that at least a portion of the photograph 1602 is visible but grayed out. By way of a non-limiting example, the graying out of the photograph 1602 and appearance of the product offer 1604 might be in response to a mouse over or click within the boundary 1608 of the media object 1600.

Figure 17:
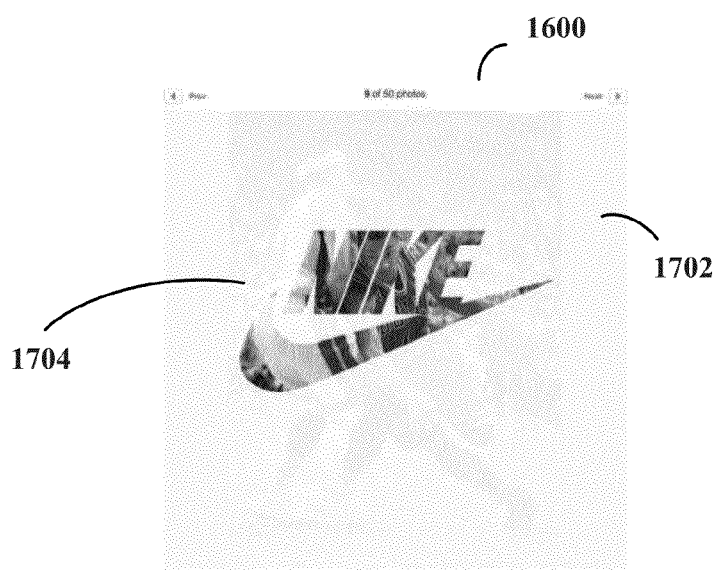

FIG. 17 provides an example of a manufacturer's logo as a media enrichment presentation item to a media object 1700, e.g., a slide show media object comprising multiple photographs. In the example shown, photograph 1702, a photograph of basketball players is displayed with a logo 1704. The logo 1704 is for a manufacturer of clothing worn by the basketball players, for example. The logo 1702 is superimposed over a portion of the photograph 1702, such that the portion of the photograph 1702 coincident with the logo 1704 is shown and the remainder of the photograph 1702 is grayed out.

Figure 18:
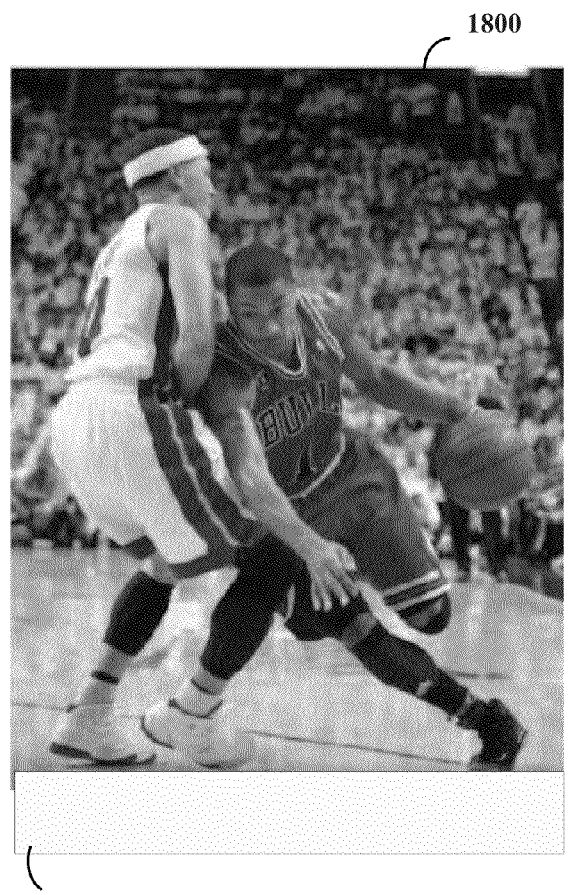
Figure 19:

FIGS. 18 and 19 provide an example of multiple advertisement and/or product offers associated with media object 1800. The multiple advertisements and/or product offers can be displayed, in accordance with the associated profile, relative to media object 1800 in a carousel media enrichment presentation item 1806. FIG. 19 provides an example of the carousel media enrichment presentation item 1806. In the example shown in FIG. 19, the carousel 1806 includes the manufacturer's logo, together with various products of the manufacturer. In the example, the carousel media enrichment presentation item 1806 includes controls to scroll through products displayed via the carousel media enrichment presentation item 1806 and a control to close the media enrichment presentation item 1806.

Figure 20:
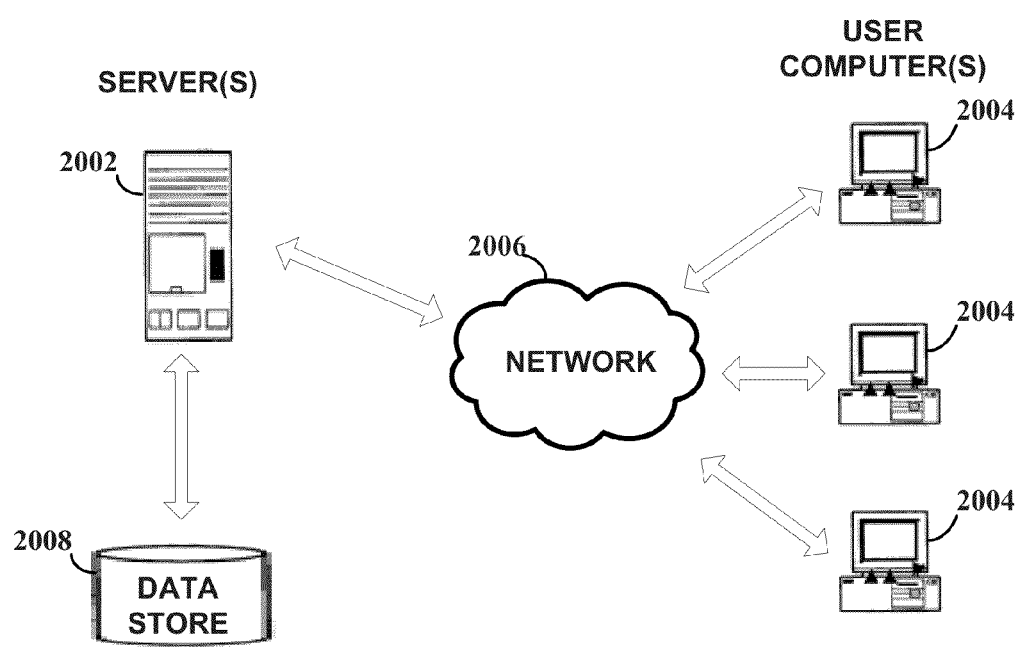
FIG. 20 illustrates some components that can be used in connection with one or more embodiments of the present disclosure.

FIG. 20 illustrates some components that can be used in connection with one or more embodiments of the present disclosure. In accordance with one or more embodiments of the present disclosure, one or more computing devices, e.g., one or more servers, user computing devices or other computing device, are configured to comprise functionality described herein. For example, a computing device 2002 can be configured to execute program code, instructions, etc. to provide functionality in accordance with one or more embodiments of the present disclosure. The same or another computing device 2002 can be configured to provide functionality provided in connection with IME server 106, media repository 108, media queue processing module 202, editorial queue 204 and/or editorial enrichment and validation tool 206.

Computing device 2002 can serve content to user computing devices, e.g., a user computing device executing IME client 102 and browser 104, via a network 2006. Data store 2008 can be used to store data or information provided by the media repository 108, log(s) 118, profile store 110, product offer source(s) 112, display ad source(s) 114 and/or information source(s) 116. Data store 2008 can further be used to store program code to configure a computing device, such as without limitation IME server 106, to execute functionality in accordance with one or more embodiments disclosed herein.

The user computing device 2004 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 2002 and the user computing device 2004 can include one or more processors, memory, a removable media reader, network interface, display and interface, and one or more input devices, e.g., keyboard, keypad, mouse, etc. and input device interface, for example. One skilled in the art will recognize that server 2002 and user computing device 2004 may be configured in many different ways and implemented using many different combinations of hardware, software, or firmware.

In accordance with one or more embodiments, a computing device 2002 can make a user interface available to a user computing device 2004 via the network 2006. The user interface made available to the user computing device 2004 can include content items, or identifiers (e.g., URLs) selected for the user interface in accordance with one or more embodiments of the present invention. In accordance with one or more embodiments, computing device 2002 makes a user interface available to a user computing device 2004 by communicating a definition of the user interface to the user computing device 2004 via the network 2006. The user interface definition can be specified using any of a number of languages, including without limitation a markup language such as Hypertext Markup Language, scripts, applets and the like. The user interface definition can be processed by an application executing on the user computing device 2004, such as a browser application, to output the user interface on a display coupled, e.g., a display directly or indirectly connected, to the user computing device 2004.

In an embodiment the network 2006 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

It should be apparent that embodiments of the present disclosure can be implemented in a client-server environment such as that shown in FIG. 20. Alternatively, embodiments of the present disclosure can be implemented other environments, e.g., a peer-to-peer environment as one non-limiting example.

Figure 21:
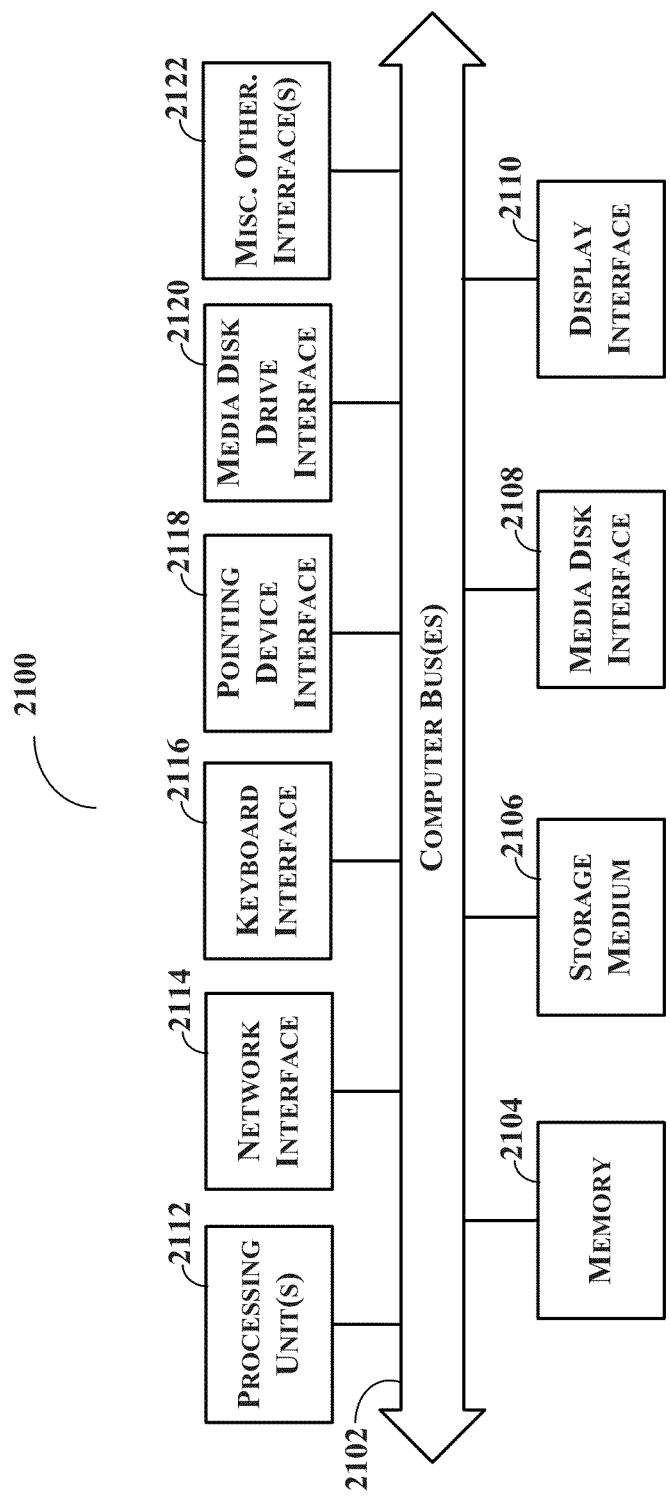
FIG. 21 is a detailed block diagram illustrating an internal architecture of a computing device in accordance with one or more embodiments of the present disclosure.

FIG. 21 is a detailed block diagram illustrating an internal architecture of a computing device, e.g., a computing device such as server 2002 or user computing device 2004, in accordance with one or more embodiments of the present disclosure. As shown in FIG. 21, internal architecture 2100 includes one or more processing units, processors, or processing cores, (also referred to herein as CPUs) 2112, which interface with at least one computer bus 2102. Also interfacing with computer bus 2102 are computer-readable medium, or media, 2106, network interface 2114, memory 2104, e.g., random access memory (RAM), run-time transient memory, read only memory (ROM), etc., media disk drive interface 2120 as an interface for a drive that can read and/or write to media including removable media such as floppy, CD-ROM, DVD, etc. media, display interface 2110 as interface for a monitor or other display device, keyboard interface 2116 as interface for a keyboard, pointing device interface 2118 as an interface for a mouse or other pointing device, and miscellaneous other interfaces not shown individually, such as parallel and serial port interfaces, a universal serial bus (USB) interface, and the like.

Memory 2104 interfaces with computer bus 2102 so as to provide information stored in memory 2104 to CPU 2112 during execution of software programs such as an operating system, application programs, device drivers, and software modules that comprise program code, and/or computer-executable process steps, incorporating functionality described herein, e.g., one or more of process flows described herein. CPU 2112 first loads computer-executable process steps from storage, e.g., memory 2104, computer-readable storage medium/media 2106, removable media drive, and/or other storage device. CPU 2112 can then execute the stored process steps in order to execute the loaded computer-executable process steps. Stored data, e.g., data stored by a storage device, can be accessed by CPU 2112 during the execution of computer-executable process steps.

Persistent storage, e.g., medium/media 2106, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
   transmitting, via at least one processing unit, embedded code in connection with a media object to be presented in connection with a web page, the embedded code to generate a request to enrich the media object's presentation;
   receiving, via the at least one processing unit, the request to enrich the media object's presentation, the request comprising a media object identifier identifying the media object and a profile identifier identifying a media enrichment profile that identifies a number of content items to be presented as media enrichment presentation items to enrich the media object's presentation and specifies a manner of presentation for each of the one or more media enrichment presentation items at a user computer, the number of content items identified by the media enrichment profile comprising at least one advertisement;
   retrieving, via the at least one processing unit, the media object's information using the media object identifier;
   retrieving, via the at least one processing unit and from a profile store, the media enrichment profile using the profile identifier;
   retrieving, via the at least one processing unit and from the media enrichment profile, information identifying each type of media enrichment presentation item to be presented in connection with the media object's presentation and a number of each type of media enrichment presentation item;
   accessing, via the at least one processing unit, one or more media enrichment presentation item sources and identifying a reference for each of the one or more media enrichment presentation items in accordance with the number of each type of media enrichment presentation item indicated by the media enrichment profile; and
   transmitting, via at least one processing unit, a response to the request, the response including a reference to each media enrichment presentation item, each reference to a media enrichment presentation item comprising information for use in retrieving the media enrichment presentation item for presentation in connection with the media object's presentation.

2. The method of claim 1, accessing one or more media enrichment presentation item stores further comprising:
   accessing, via the at least one processing unit, at least one advertisement source where the media enrichment profile indicates one or more advertisements for presentation in connection with the media object's presentation;
   accessing, via the at least one processing unit, at least one product offer source where the media enrichment profile indicates one or more product offers for presentation in connection with the media object's presentation; and
   accessing, via the at least one processing unit, at least one contextual information source where the media enrichment profile indicates one or more contextual information boxes for presentation in connection with the media object's presentation.

3. The method of claim 1, wherein the embedded code is embedded in the web page.

4. The method of claim 1, wherein the embedded code is embedded in the media object.

5. The method of claim 1, the retrieving the media object's information using the media object identifier further comprising:
   accessing, via the at least one processing unit, a media object repository using the media object identifier to retrieve the media object's information;
   invoking, via the at least one processing unit, at least one automated media object enrichment tool to collect the media object's information where the media object's information is not found in the media object repository.

6. The method of claim 5, the method further comprising;
   if the media object's information is not found in the media object repository, providing a user interface for human editors to validate the media object's information collected from the at least one automated media object enrichment tool and to input at least a portion of the media object's information.

7. The method of claim 5, the at least one automated media object enrichment tool comprising a crowd sourcing internet market place to engage a plurality of internet users to identify at least a portion of the media object's information.

8. The method of claim 5, the invoking at least one automated media object enrichment tool further comprising:
   accessing, via the at least one processing unit, at least one metadata source to retrieve the media object's metadata, the metadata including a title, description and category; and
   accessing, via the at least one processing unit, an advertisement classifier to determine at least one advertising category using at least a portion of the retrieved metadata, the media object's information comprising the at least one advertising category.

9. The method of claim 5, the invoking at least one automated media object enrichment tool further comprising:
   invoking, via the at least one processing unit, a visual analyzer to identify at least one object in the media object, the media object's information comprising information identifying the at least one object in the media object, the information identifying the at least one object for use in identifying at least one product offer for presentation in connection with the media object's presentation.

10. The method of claim 5, the invoking at least one automated media object enrichment tool further comprising:
invoking, via the at least one processing unit, a visual analyzer to identify at least one object in the media object, the media object's information comprising information for the at least one object contained in the media object, the information for the at least one object for use in identifying a contextual information item for presentation in connection with the media object's presentation.

11. A system comprising:
at least one computing device comprising one or more processors and a storage medium for tangibly storing thereon program logic for execution by the one or more processors, the stored program logic comprising:
transmitting logic executed by the one or more processors for transmitting embedded code in connection with a media object to be presented in connection with a web page, the embedded code to generate a request to enrich the media object in connection with the media object's presentation;
receiving logic executed by the one or more processors for receiving the request to enrich the media object, the request comprising a media object identifier identifying the media object and a profile identifier identifying a media enrichment profile media enrichment profile that identifies a number of content items to be presented as media enrichment presentation items to enrich the media object's presentation and specifies a manner of presentation for each of the one or more media enrichment presentation items at a user computer, the number of content items identified by the media enrichment profile comprising at least one advertisement;
retrieving logic executed by the one or more processors for retrieving the media object's information using the media object identifier;
retrieving logic executed by the one or more processors for retrieving, from a profile store, the media enrichment profile using the profile identifier;
retrieving logic executed by the processor for retrieving, from the media enrichment profile, information identifying each type of media enrichment presentation item to be presented in connection with the media object's presentation and a number of each type of media enrichment presentation item;
accessing logic executed by the processor for accessing one or more media enrichment presentation item sources and identifying a reference for each of the one or more media enrichment presentation items in accordance with the number of each type of media enrichment presentation item indicated by the media enrichment profile; and
transmitting logic executed by the one or more processors for transmitting a response to the request, the response including a reference to each media enrichment presentation item, each reference to a media enrichment presentation item comprising information for use in retrieving the media enrichment presentation item for presentation in connection with the media object's presentation.

12. The system of claim 11, the accessing logic executed by the one or more processors for accessing one or more media enrichment presentation item stores further comprising:
accessing logic executed by the one or more processors for accessing at least one advertisement source where the media enrichment profile indicates one or more advertisements for presentation in connection with the media object's presentation;
accessing logic executed by the one or more processors for accessing at least one product offer source where the media enrichment profile indicates one or more product offers for presentation in connection with the media object's presentation; and
accessing logic executed by the one or more processors for accessing at least one contextual information source where the media enrichment profile indicates one or more contextual information boxes for presentation in connection with the media object's presentation.

13. The system of claim 11, wherein the embedded code is embedded in the web page.

14. The system of claim 11, wherein the embedded code is embedded in the media object.

15. The system of claim 11, the retrieving logic for execution by the one or more processors for retrieving the media object's information using the media object identifier further comprising:
accessing logic executed by the one or more processors for accessing a media object repository using the media object identifier to retrieve the media object's information;
invoking logic executed by the one or more processors for invoking at least one automated media object enrichment tool to collect the media object's information where the media object's information is not found in the media object repository.

16. The system of claim 15, the program logic further comprising:
providing logic executed by the one or more processors for providing, if the media object's information is not found in the media object repository, a user interface for human editors to validate the media object's information collected from the at least one automated media object enrichment tool and to input at least a portion of the media object's information.

17. The system of claim 15, the at least one automated media object enrichment tool comprising a crowd sourcing internet market place to engage a plurality of internet users to identify at least a portion of the media object's information.

18. The system of claim 15, the invoking logic executed by the one or more processors for invoking at least one automated media object enrichment tool further comprising:
accessing logic for execution by the one or more processors for accessing at least one metadata source to retrieve the media object's metadata, the metadata including a title, description and category; and
accessing logic for execution by the one or more processors for accessing an advertisement classifier to determine at least one advertising category using at least a portion of the retrieved metadata, the media object's information comprising the at least one advertising category.

19. The system of claim 15, the invoking logic for execution by the one or more processors for invoking at least one automated media object enrichment tool further comprising:
invoking logic for execution by the one or more processors for invoking a visual analyzer to identify at least one object in the media object, the media object's information comprises information identifying the at least one object in the media object, the information identifying the at least one object for use in identifying at least one product offer for presentation in connection with the media object's presentation.

20. The system of claim 15, the invoking logic executed by the one or more processors for invoking at least one automated media object enrichment tool further comprising:
invoking logic executed by the one or more processors for invoking a visual analyzer to identify at least one object in the media object, the media object's information comprising information for the at least one object contained in the media object, the information for the at least one object for use in identifying a contextual information item for presentation in connection with the media object's presentation.

21. A computer readable non-transitory storage medium for tangibly storing thereon computer readable instructions that when executed cause at least one processor to:
transmit embedded code in connection with a media object to be presented in connection with a web page, the embedded code to generate a request to enrich the media object's presentation;
receive the request to enrich the media object's presentation, the request comprising a media object identifier identifying the media object and a profile identifier identifying a media enrichment profile media enrichment profile that identifies a number of content items to be presented as media enrichment presentation items to enrich the media object's presentation and specifies a manner of presentation for each of the one or more media enrichment presentation items at a user computer, the number of content items identified by the media enrichment profile comprising at least one advertisement;
retrieve the media object's information using the media object identifier;
retrieve, from a profile store, the media enrichment profile using the profile identifier;
retrieve, from the media enrichment profile, information identifying each type of media enrichment presentation item to be presented in connection with the media object's presentation and a number of each type of media enrichment presentation item;
access one or more media enrichment presentation item sources and identifying a reference for each of the one or more media enrichment presentation items in accordance with the number of each type of media enrichment presentation item indicated by the media enrichment profile; and
transmit a response to the request, the response including a reference to each media enrichment presentation item, each reference to a media enrichment presentation item comprising information for use in retrieving the media enrichment presentation item for presentation in connection with the media object's presentation.

22. The medium of claim 21, the computer readable instructions that when executed further cause at least one processor to access one or more media enrichment presentation item stores further comprising instructions to:
access at least one advertisement source where the media enrichment profile indicates one or more advertisements for presentation in connection with the media object's presentation;
access at least one product offer source where the media enrichment profile indicates one or more product offers for presentation in connection with the media object's presentation; and
access at least one contextual information source where the media enrichment profile indicates one or more contextual information boxes for presentation in connection with the media object's presentation.

23. The medium of claim 21, wherein the embedded code is embedded in the web page.

24. The medium of claim 21, wherein the embedded code is embedded in the media object.

25. The medium of claim 21, the computer readable instructions that when executed cause at least one processor to retrieve the media object's information using the media object identifier further comprising instructions to:
access a media object repository using the media object identifier to retrieve the media object's information;
invoke at least one automated media object enrichment tool to collect the media object's information where the media object's information is not found in the media object repository.

26. The medium of claim 25, the computer readable instructions further comprising instructions that when executed cause at least one processor to:
provide, if the media object's information is not found in the media object repository, a user interface for human editors to validate the media object's information collected from the at least one automated media object enrichment tool and to input at least a portion of the media object's information.

27. The medium of claim 25, the at least one automated media object enrichment tool comprising a crowd sourcing internet market place to engage a plurality of internet users to identify at least a portion of the media object's information.

28. The medium of claim 25, the computer readable instructions to cause at least one processor to invoke at least one automated media object enrichment tool further comprising instructions to:
access at least one metadata source to retrieve the media object's metadata, the metadata including a title, description and category; and
access an advertisement classifier to determine at least one advertising category using at least a portion of the retrieved metadata, the media object's information comprising the at least one advertising category.

29. The medium of claim 25, the computer readable instructions to cause at least one processor to invoke at least one automated media object enrichment tool further comprising instructions to:
invoke a visual analyzer to identify at least one object in the media object, the media object's information comprising information identifying the at least one object in the media object, the information identifying the at least one object for use in identifying at least one product offer for presentation in connection with the media object's presentation.

30. The medium of claim 25, computer readable instructions to cause at least one processor to invoke at least one automated media object enrichment tool further comprising instructions to:
invoke a visual analyzer to identify at least one object in the media object, the media object's information comprising information for the at least one object contained in the media object, the information for the at least one object for use in identifying a contextual information item for presentation in connection with the media object's presentation.

* * * * *